(12) United States Patent
Rose et al.

(10) Patent No.: US 7,946,613 B2
(45) Date of Patent: May 24, 2011

(54) DUAL CHAMBER AIRBAG CUSHION

(75) Inventors: Larry D. Rose, South Weber, UT (US);
Jeffrey D. Williams, Roy, UT (US);
Brad Smith, Plain City, UT (US); Greg Waters, Riverdale, UT (US); Mark Enders, Pleasant View, UT (US); John Newkirk, Layton, UT (US); Patrick Jamison, North Ogden, UT (US); Kent Potter, Brigham City, UT (US);
Shankar Balaskandan, Salt Lake City, UT (US); Changsoo Choi, Rochester, MI (US); Ralph Tree, Farr West, UT (US)

(73) Assignee: Autoliv ASP, Inc., Ogden, UT (US)

( * ) Notice: Subject to any disclaimer, the term of this patent is extended or adjusted under 35 U.S.C. 154(b) by 34 days.

(21) Appl. No.: 12/397,019

(22) Filed: Mar. 3, 2009

(65) Prior Publication Data
US 2010/0225094 A1   Sep. 9, 2010

(51) Int. Cl.
B60R 21/16   (2006.01)
(52) U.S. Cl. ........................................ 280/729
(58) Field of Classification Search ............... 280/729, 280/732, 739, 740, 743.1, 743.2
See application file for complete search history.

(56) References Cited

U.S. PATENT DOCUMENTS

| | | | |
|---|---|---|---|
| 3,843,150 A | 10/1974 | Harada et al. | |
| 5,016,913 A | 5/1991 | Nakajima et al. | |
| 5,129,675 A | 7/1992 | Wang | |
| 5,172,933 A | 12/1992 | Strasser | |
| 5,240,283 A * | 8/1993 | Kishi et al. | ........... 280/729 |
| 5,246,250 A | 9/1993 | Wolanin et al. | |
| 5,280,953 A | 1/1994 | Wolanin et al. | |
| 5,290,953 A | 3/1994 | Clark, Jr. et al. | |
| 5,306,043 A | 4/1994 | Mihm et al. | |
| 5,310,214 A | 5/1994 | Cuevas | |
| 5,350,188 A | 9/1994 | Sato | |
| 5,405,166 A | 4/1995 | Rogerson | |
| 5,421,607 A | 6/1995 | Gordon | |
| 5,492,363 A | 2/1996 | Hartmeyer et al. | |
| 5,494,314 A | 2/1996 | Kriska et al. | |
| 5,520,413 A | 5/1996 | Mossi et al. | |
| 5,599,041 A | 2/1997 | Turnbull et al. | |
| 5,603,526 A | 2/1997 | Buchanan | |
| 5,775,729 A | 7/1998 | Schneider et al. | |
| 5,927,748 A | 7/1999 | O'Driscoll | |
| 5,931,497 A | 8/1999 | Fischer | |
| 5,945,184 A * | 8/1999 | Nagata et al. | ........... 428/35.2 |
| 6,056,318 A | 5/2000 | Braunschadel | |
| 6,095,557 A | 8/2000 | Takimoto et al. | |
| 6,126,196 A | 10/2000 | Zimmerman | |
| 6,139,048 A | 10/2000 | Braunschadel | |

(Continued)

FOREIGN PATENT DOCUMENTS

DE    196 40 322    3/1996

(Continued)

Primary Examiner — Paul N Dickson
Assistant Examiner — Robert A Coker
(74) Attorney, Agent, or Firm — Sally J. Brown; Stoel Rives LLP

(57) ABSTRACT

An airbag cushion has two chambers to permit the front chamber to inflate less rapidly than the back chamber for cushioning the head of an occupant in a vehicle with less force than the chest of an occupant is cushioned by the back chamber.

24 Claims, 15 Drawing Sheets

U.S. PATENT DOCUMENTS

| | | |
|---|---|---|
| 6,183,003 B1 | 2/2001 | Matsuhashi et al. |
| 6,206,408 B1 | 3/2001 | Schneider |
| 6,247,726 B1 | 6/2001 | Ryan |
| 6,290,257 B1 | 9/2001 | Bunce et al. |
| 6,371,509 B1 | 4/2002 | Ellerbrok et al. |
| 6,390,501 B1 | 5/2002 | Greib et al. |
| 6,398,258 B2 | 6/2002 | Hamada et al. |
| 6,419,267 B1 * | 7/2002 | Hashimoto et al. ......... 280/743.1 |
| 6,454,300 B1 | 9/2002 | Dunkle et al. |
| 6,536,800 B2 | 3/2003 | Kumagai et al. |
| 6,554,313 B2 * | 4/2003 | Uchida ........................ 280/729 |
| 6,631,921 B1 | 10/2003 | Drossler et al. |
| 6,631,922 B2 | 10/2003 | Hess et al. |
| 6,648,371 B2 | 11/2003 | Vendely et al. |
| 6,746,045 B2 | 6/2004 | Short et al. |
| 6,749,217 B2 | 6/2004 | Damian et al. |
| 6,773,027 B2 | 8/2004 | Bohn et al. |
| 6,773,030 B2 | 8/2004 | Fischer |
| 6,784,379 B2 | 8/2004 | Breed et al. |
| 6,786,505 B2 | 9/2004 | Yoshida |
| 6,832,778 B2 | 12/2004 | Pinsenschaum et al. |
| 6,832,780 B2 | 12/2004 | Amamori |
| 6,846,008 B2 | 1/2005 | Kamiji et al. |
| 6,863,304 B2 | 3/2005 | Reiter et al. |
| 6,918,613 B2 | 7/2005 | Short et al. |
| 6,932,385 B2 | 8/2005 | Hawthorn et al. |
| 6,962,363 B2 | 11/2005 | Wang et al. |
| 6,971,664 B2 * | 12/2005 | Amamori ................... 280/743.1 |
| 6,971,671 B2 | 12/2005 | Schneider et al. |
| 7,000,947 B2 | 2/2006 | Kumagai et al. |
| 7,052,042 B2 | 5/2006 | Sato et al. |
| 7,059,634 B2 | 6/2006 | Bossecker et al. |
| 7,066,487 B2 | 6/2006 | Sullivan et al. |
| 7,083,191 B2 | 8/2006 | Fischer |
| 7,083,192 B2 | 8/2006 | Fischer et al. |
| 7,131,664 B1 | 11/2006 | Pang et al. |
| 7,152,880 B1 | 12/2006 | Pang et al. |
| 7,192,053 B2 | 3/2007 | Thomas |
| 7,195,281 B2 | 3/2007 | Williams et al. |
| 7,210,702 B2 | 5/2007 | Soderquist |
| 7,237,802 B2 | 7/2007 | Rose et al. |
| 7,243,947 B2 | 7/2007 | Bosch |
| 7,261,319 B2 | 8/2007 | DePottey et al. |
| 7,328,915 B2 | 2/2008 | Smith et al. |
| 7,347,450 B2 | 3/2008 | Williams et al. |
| 7,350,807 B2 | 4/2008 | Schneider et al. |
| 7,360,789 B2 | 4/2008 | Bito |
| 7,364,192 B2 | 4/2008 | Braun et al. |
| 7,377,548 B2 | 5/2008 | Bauer et al. |
| 7,396,043 B2 | 7/2008 | Choi et al. |
| 7,441,805 B2 | 10/2008 | Jamison et al. |
| 7,484,757 B2 | 2/2009 | Thomas et al. |
| 7,556,290 B2 | 7/2009 | Williams et al. |
| 7,568,729 B2 | 8/2009 | Schneider et al. |
| 7,597,355 B2 | 10/2009 | Williams et al. |
| 7,597,356 B2 | 10/2009 | Williams |
| 7,604,252 B2 * | 10/2009 | Heitplatz et al. ............ 280/730.1 |
| 7,607,689 B2 | 10/2009 | Kalczynski et al. |
| 7,614,653 B2 | 11/2009 | Rose et al. |
| 7,614,654 B2 | 11/2009 | Williams |
| 7,654,561 B2 * | 2/2010 | Webber et al. ................. 280/729 |
| 7,673,899 B2 * | 3/2010 | Abe .............................. 280/742 |
| 7,695,012 B2 | 4/2010 | Libby et al. |
| 7,722,080 B2 | 5/2010 | Rose et al. |
| 7,748,738 B2 | 7/2010 | Schneider |
| 7,762,576 B2 * | 7/2010 | Cho ............................... 280/729 |
| 7,770,926 B2 | 8/2010 | Schneider |
| 7,784,828 B2 | 8/2010 | Mills et al. |
| 2001/0033072 A1 | 10/2001 | Kumagai et al. |
| 2002/0063416 A1 | 5/2002 | Kamaiji et al. |
| 2002/0117840 A1 | 8/2002 | Dunkle et al. |
| 2002/0175511 A1 | 11/2002 | Dunkle et al. |
| 2003/0020266 A1 | 1/2003 | Vendely et al. |
| 2003/0020268 A1 | 1/2003 | Reiter et al. |
| 2003/0030254 A1 * | 2/2003 | Hasebe ........................ 280/729 |
| 2003/0057691 A1 | 3/2003 | Tokita et al. |
| 2003/0127839 A1 | 7/2003 | Jenkins |
| 2003/0209895 A1 | 11/2003 | Gu |
| 2003/0214125 A1 | 11/2003 | Schneider et al. |
| 2003/0218325 A1 | 11/2003 | Hasebe et al. |
| 2003/0230883 A1 | 12/2003 | Heym |
| 2004/0012179 A1 | 1/2004 | Pinsenschaum et al. |
| 2004/0056459 A1 | 3/2004 | Kassman et al. |
| 2004/0090054 A1 | 5/2004 | Bossecker et al. |
| 2004/0130135 A1 | 7/2004 | Ekdahl |
| 2004/0164526 A1 | 8/2004 | Hasebe et al. |
| 2004/0188990 A1 | 9/2004 | Short et al. |
| 2004/0232681 A1 | 11/2004 | Adomeit |
| 2004/0256842 A1 | 12/2004 | Breed et al. |
| 2005/0035582 A1 | 2/2005 | Kim |
| 2005/0052008 A1 | 3/2005 | Rose et al. |
| 2005/0057027 A1 | 3/2005 | Fogle et al. |
| 2005/0077708 A1 | 4/2005 | Sollars |
| 2005/0098990 A1 | 5/2005 | Pinsenschaum et al. |
| 2005/0098994 A1 | 5/2005 | Matsumura |
| 2005/0161918 A1 | 7/2005 | Bito |
| 2005/0236822 A1 | 10/2005 | Rose et al. |
| 2005/0248137 A1 | 11/2005 | Delventhal et al. |
| 2006/0001244 A1 | 1/2006 | Taguchi et al. |
| 2006/0028009 A1 | 2/2006 | Hasebe et al. |
| 2006/0049618 A1 | 3/2006 | Bito |
| 2006/0071461 A1 | 4/2006 | Williams et al. |
| 2006/0071462 A1 | 4/2006 | Smith et al. |
| 2006/0103118 A1 | 5/2006 | Hasebe |
| 2006/0151979 A1 | 7/2006 | DePottey et al. |
| 2006/0186647 A1 | 8/2006 | Bosch |
| 2006/0197318 A1 | 9/2006 | Choi et al. |
| 2006/0197327 A1 | 9/2006 | Maripudi et al. |
| 2006/0202454 A1 | 9/2006 | Parizal et al. |
| 2006/0249934 A1 | 11/2006 | Hasebe |
| 2006/0267323 A1 | 11/2006 | Schneider et al. |
| 2006/0284404 A1 | 12/2006 | Green et al. |
| 2007/0024032 A1 | 2/2007 | Hasebe |
| 2007/0040358 A1 | 2/2007 | Kismir |
| 2007/0045997 A1 | 3/2007 | Abe et al. |
| 2007/0052222 A1 | 3/2007 | Higuchi et al. |
| 2007/0108750 A1 | 5/2007 | Bauer et al. |
| 2007/0126218 A1 | 6/2007 | Schnieder et al. |
| 2007/0126219 A1 | 6/2007 | Williams |
| 2007/0132222 A1 | 6/2007 | Thomas et al. |
| 2007/0182143 A1 | 8/2007 | Wright |
| 2007/0200320 A1 | 8/2007 | Keshavaraj |
| 2007/0205590 A1 | 9/2007 | Klinkenberger et al. |
| 2007/0216146 A1 | 9/2007 | Williams |
| 2007/0262572 A1 | 11/2007 | Fischer et al. |
| 2007/0290489 A1 | 12/2007 | Aranzulla et al. |
| 2008/0007038 A1 | 1/2008 | Fischer et al. |
| 2008/0018086 A1 | 1/2008 | Ford et al. |
| 2008/0023950 A1 | 1/2008 | Kalczynski et al. |
| 2008/0023959 A1 | 1/2008 | Crawford |
| 2008/0073890 A1 | 3/2008 | Williams et al. |
| 2008/0073891 A1 | 3/2008 | Rose et al. |
| 2008/0073892 A1 | 3/2008 | Rose et al. |
| 2008/0073893 A1 | 3/2008 | Schneider |
| 2008/0079250 A1 | 4/2008 | Boyle et al. |
| 2008/0203713 A1 | 8/2008 | McFadden et al. |
| 2008/0303256 A1 | 12/2008 | Williams |
| 2009/0033081 A1 | 2/2009 | Flischer et al. |
| 2009/0039630 A1 | 2/2009 | Schneider et al. |
| 2009/0230663 A1 | 9/2009 | Mills et al. |
| 2009/0250912 A1 | 10/2009 | Libby et al. |
| 2009/0256338 A1 * | 10/2009 | Williams ...................... 280/735 |
| 2010/0019476 A1 | 1/2010 | Pausch |
| 2010/0032931 A1 | 2/2010 | Kumagai et al. |
| 2010/0102542 A1 | 4/2010 | Nakajima et al. |
| 2010/0225094 A1 | 9/2010 | Rose et al. |
| 2010/0225095 A1 | 9/2010 | Smith et al. |

FOREIGN PATENT DOCUMENTS

| | | |
|---|---|---|
| DE | 293 91 521 | 7/2003 |
| EP | 0 458 838 | 5/1996 |
| EP | 1824710 | 6/2009 |
| GB | 1 362 672 | 8/1974 |
| GB | 2328646 | 3/1999 |
| JP | 05085295 | 4/1993 |
| JP | 11321506 | 11/1999 |
| JP | 2001-030863 | 2/2001 |

| | | | | | | |
|---|---|---|---|---|---|---|
| JP | 2001-158315 | 6/2001 | | WO | WO 2007/067371 | 6/2007 |
| JP | 2005-247118 | 9/2005 | | WO | WO 2007/067377 | 6/2007 |
| JP | 2005-280470 | 10/2005 | | WO | WO 2009/020786 | 8/2009 |
| WO | WO 2006/041547 | 4/2006 | | WO | WO 2008/150578 | 12/2009 |
| WO | WO 2006/041552 | 4/2006 | | WO | WO-2010/101673 | 9/2010 |
| WO | WO 2006/073534 | 7/2006 | | | | |

* cited by examiner

DUAL CHAMBER AIRBAG CUSHION

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings as listed below.

FIG. 7A is a perspective view of one of the closeable safety vents shown in FIG. 6 after it has been closed.

DETAILED DESCRIPTION OF THE PREFERRED EMBODIMENTS

Figure 1:
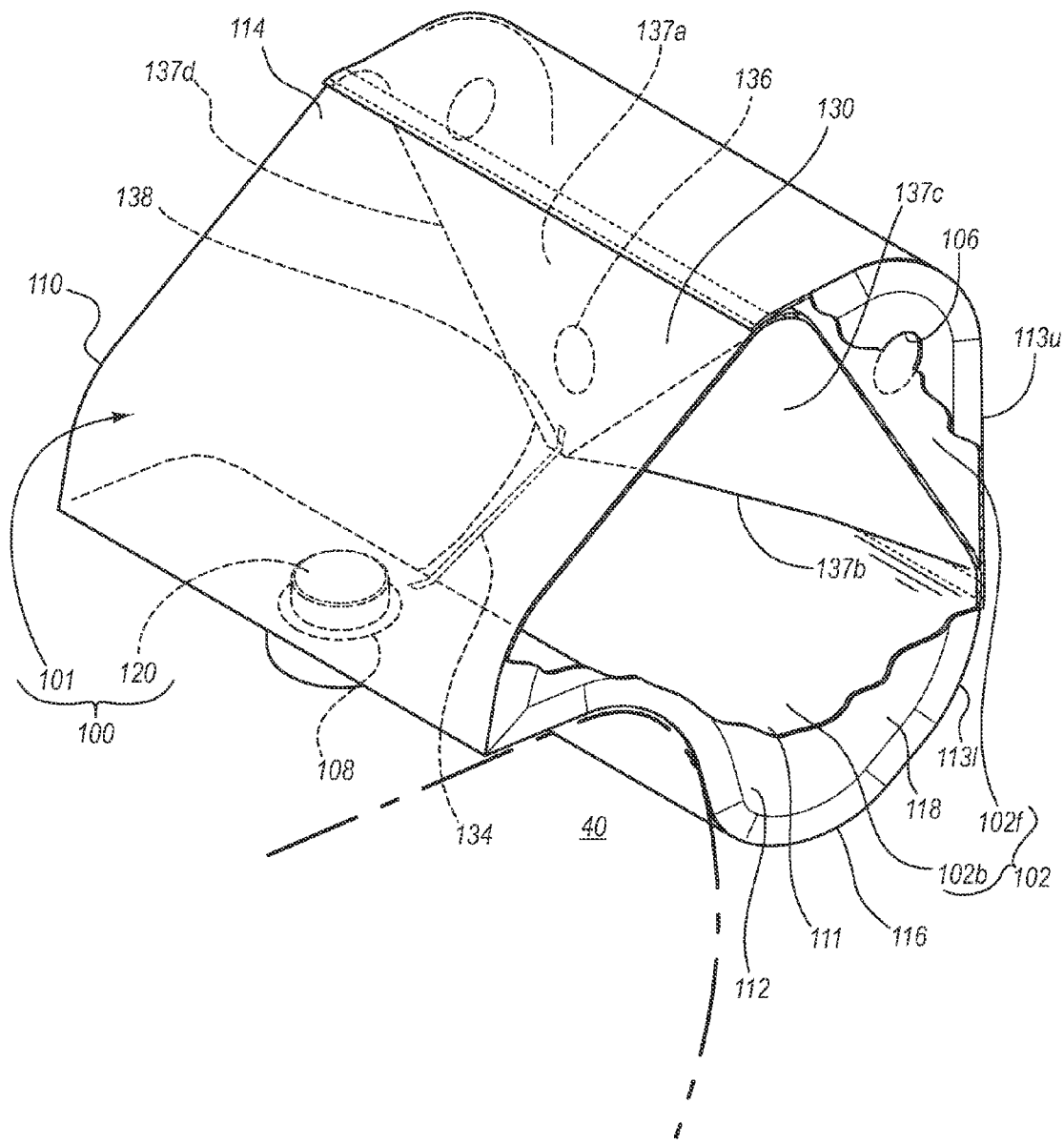
FIG. 1 is a perspective view of an airbag module and its airbag cushion with a partial cut-away to show the tethered partition.

Described below are embodiments of an airbag cushion. As those of skill in the art will appreciate, the principles of the invention may be applied to and used with a variety of airbag deployment systems including frontal driver and passenger airbags. Such airbag cushions are frequently located in an instrument panel and directly in front of an occupant. During a collision, an airbag cushion inflates and deploys through a cosmetic cover. The airbag cushion deploys towards the occupant and provides a restraint.

Because an upper torso has a mass that is significantly larger than the mass of an occupant's head, more energy is required to restrain the upper torso. To avoid restraining an occupant's head more than is necessary and to minimize neck injuries, airbag cushions are disclosed that deliver less force to an occupant's head than is delivered to an occupant's upper torso. The embodiments disclosed herein feature an airbag with two distinct chambers. One chamber is expanded by receiving inflation gas directly from an inflator while the other chamber indirectly receives inflation gas. In the depicted embodiments, a partition divides an interior of an airbag cushion to provide a back chamber for restraining an occupant's torso that receives inflation gas directly from an inflator and a front chamber for restraining an occupant's head that receives gas through the partition.

Embodiments are also disclosed that provide mechanisms to prevent full inflation of the front chamber and/or the back chamber. Full inflation of an airbag is not always desired. For example, partial inflation offers optimal protection when the occupant being protected by the airbag cushion is a child, a baby in a rear facing car seat or an adult positioned too close to the air bag cushion. Such conditions are referred to as out-of-position conditions. Embodiments described below provide an airbag cushion that responds to an occupant's position and vents accordingly to avoid excessive deploying impact. These embodiments have a closeable opening for venting gas referred to as an optionally closeable vent for out-of-position (OOP) conditions such as a cinch vent or a closeable vent. Each closeable vent may be closed via a component such as a control tether or cord. Numerous embodiments of control tethers are disclosed including control tethers configured to incrementally close the vent. The tether may be connected at one end to a vent and at an opposing end elsewhere within or on the cushion. In one embodiment, the tether has a length that is greater than 180 mm. Such a lengthy tether allows the airbag cushion to be tethered adjacent to the tether so that it can pull the partition in so that it has a deep draw for deep cushioning of an occupant's head.

If an occupant is in close proximity to the deploying airbag and restricts normal inflation, the closeable vent remains open and allows gas to rapidly escape. If the occupant is in a normal position and inflation is unrestricted, the tension pulls on the tether to quickly close the closeable vent. Closure retains gas for normal occupant restraint. Thus, the closeable vent may be used as a variable feature in out-of-position conditions and in normal restraint conditions. In this manner, the airbag cushion is sensitive to obstructive expansion of the cushion.

Figure 2A:
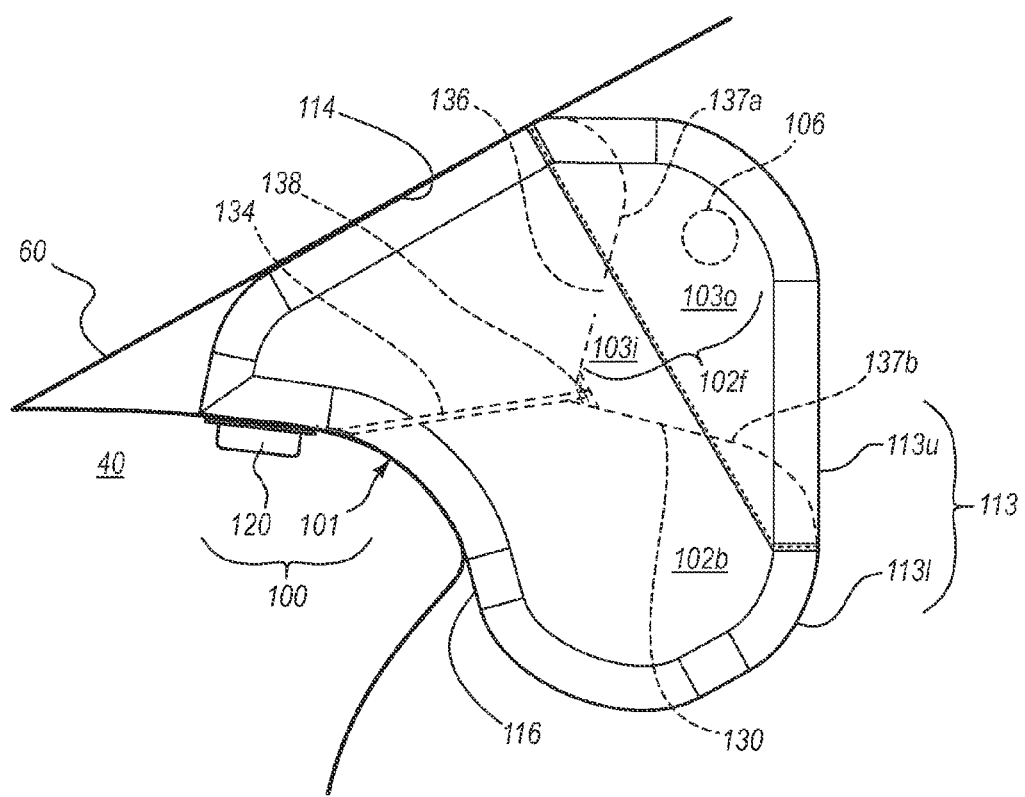
FIG. 2A is a side view of an embodiment of the airbag cushion of FIG. 1 deployed with its interior shown in phantom.
Figure 2B:
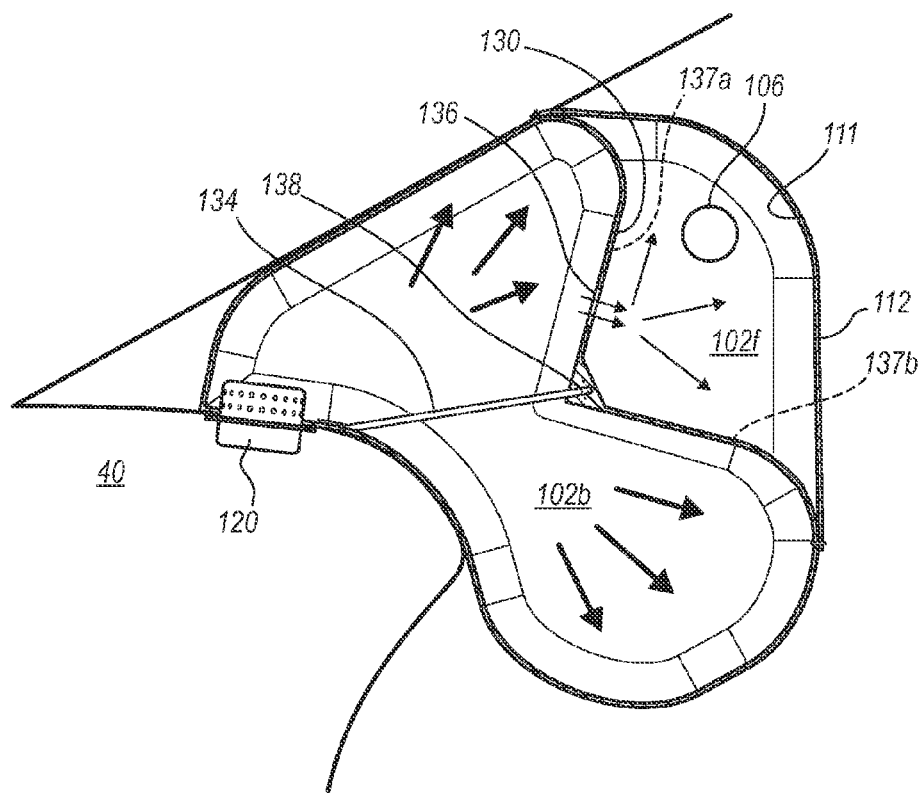
FIG. 2B is a cross-sectional view of the deployed airbag cushion of FIG. 1.
Figure 3A:
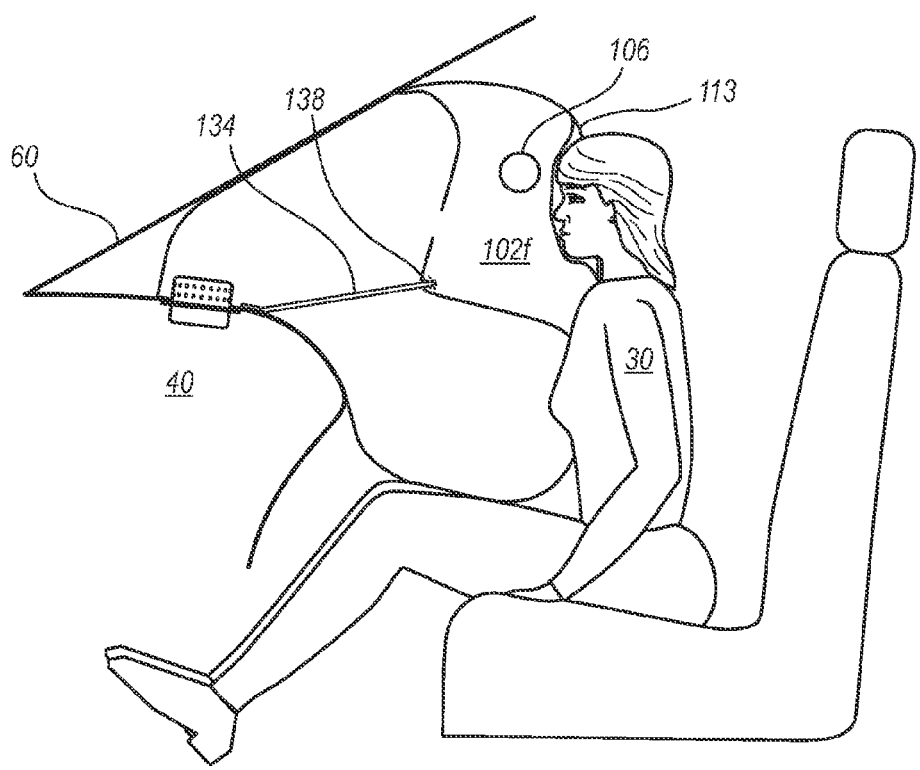
FIG. 3A is a cross-sectional view of the airbag cushion shown in FIG. 1 upon deployment in front of an occupant.
Figure 3B:
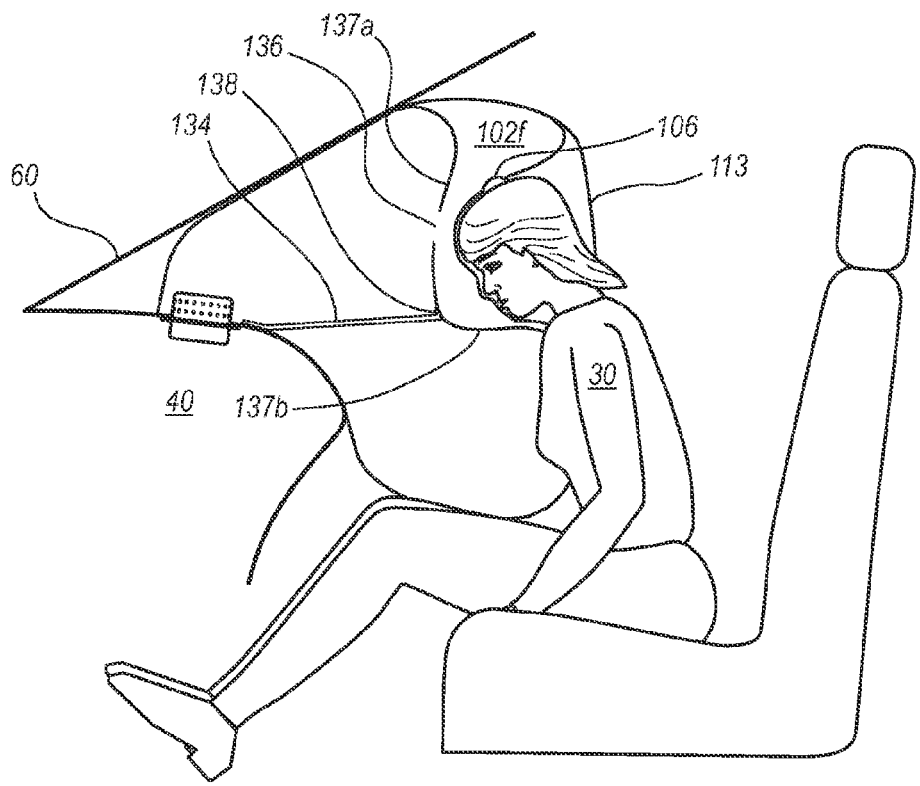
FIG. 3B is a cross-sectional view of the occupant shown in FIG. 3A as the front chamber provides cushioning for the occupant's head.

With reference now to the accompanying figures, particular embodiments of the invention will now be described in greater detail. One embodiment of airbag module 100 is shown in FIG. 1, FIGS. 2A-2B, FIGS. 3A-3B comprising an airbag cushion 101. FIGS. 3A-3B show an occupant 30 with airbag cushion 101 deployed through the instrument panel 40 against windshield 60.

Airbag cushion 101 has an interior 102 defined by cushion membrane 110. Interior 102 is divided into a back chamber 102b and a front chamber 102f. In the depicted embodiment of airbag cushion 101, front chamber 102f is attached by seams 104 and features discrete vents 106. Back chamber 102b has a throat 108 that is sized to be fitted around the inflator 120.

Cushion membrane 110 has an interior surface 111 and an exterior surface 112. Cushion membrane 110 may have any suitable shape. The depicted embodiments have a front region 113 configured to be directed toward an occupant in a vehicle when the cushion is deployed. Front region comprises an upper portion 113u and lower portion 113l. Cushion membrane 110 also comprises a top region 114, bottom region 116 and opposing side regions 118. Top region 114 is above upper portion 113u of front region 113. Bottom region 116 is below lower portion 113l of front region 113. When deployed, bottom region 116 has a portion that wraps around instrument panel 40 and another portion that extends away from the instrument panel towards the occupant's thighs.

A partition 130 extends within interior 102 laterally between side regions 118 of airbag cushion 101 to define back chamber 102b and front chamber 102f in interior 102. Back chamber 102b is sized to be inflated to a substantially larger volume than front chamber 102f. Front chamber 102f is defined by partition 130, top region 114 of the cushion membrane, upper portion 113u of front region 113 of the cushion membrane, and side regions 118. Back chamber 102b is defined by partition 130, top region 114, bottom region 116, and side regions 118. Back chamber 102b is positioned to receive inflation gas directly from inflator 120 via throat 108. This configuration enables front chamber 102f to be supported by back chamber 102b such that front chamber 102f is directed to an occupant's head.

As shown in FIGS. 2A-2B and FIGS. 3A-3B, back chamber 102b is bounded by the reaction area of the windshield 60 and the instrument panel 40 to ensure stability of cushion 101 during restraint of an occupant. Front chamber 102f extends up to windshield 60 to ensure proper restraint of the head of large occupants. However, the area of cushion 101 that is in contact with windshield 60 either does not include front chamber 102f or is the transition point between front chamber 102f and back chamber 102b. Back chamber 102b has a bottom portion which, when inflated, is the region extending from front region 113 to top region 114. Back chamber 102b also has a top portion above its bottom portion. In the depicted embodiment, the top portion is not narrower than the bottom portion so that the cushioning provided is stable and to optimally protect the occupant's head from windshield 60. Also the top portion of back chamber 102b is depicted as being at least as wide as front portion 102f.

Partition 130 has triangular portions 137a-d that converge at center 138 such that partition 130 has a pyramidal shape. Triangular portion 137a is opposite from top region 114, triangular portion 137b is opposite from lower portion 113l of front region 113 and bottom region 116, and portions 137c-d are opposite side regions 118. Front chamber 102f may be viewed as having two areas, an outer portion 103o and an inner portion 103i. A plane cutting through the cross-sectional view provided by FIG. 2A that corresponds with a pyramid base as defined by portions 137a-d, bisects front chamber 102f to define an inner portion 103i and outer portion 103o, which extends beyond back chamber 102b and has a cross-sectional shape that is roughly triangular with a rounded corner between a top leg that is shorter than its bottom leg.

Front chamber 102f receives inflation gas through partition 130 from back chamber 102b. In the embodiment depicted in FIG. 1, FIGS. 2A-2B and FIGS. 3A-3B, partition 130 has internal vents 136 to permit inflation gas to flow from back chamber 102b to front chamber 102f. However, front chamber 102f may also receive inflation gas through partition 130 from back chamber 102b due to the permeability of the partition. Both embodiments enable the front chamber to inflate less rapidly than the back chamber to cushion the head of an occupant in a vehicle. However, internal vent 136 is located in portion 137a, which is the closest portion of partition 130 to inflator 120 so that inflation of front chamber 102f is not delayed as long as it would be if the inflator was only in portion 137b. The same is true for a partition that permits the transmission of gas based on permeability. To avoid excessively delaying the inflation of front chamber 102f, front region 113 is not attached to partition 130 with a releasable tether.

In one embodiment, airbag cushion 101 has a configuration such that back chamber 102b extends further toward the occupant than front chamber 102f. FIG. 2B shows lower portion 113l of front region 113 extending just slightly further toward the occupant than upper portion 113u of front region 113. In another embodiment, back chamber 102b and front chamber 102f extends about the same distance toward an occupant. For these two embodiments, the back chamber extends no further toward the occupant than the front chamber. In an additional embodiment, the front chamber extends further toward the occupant when fully inflated but does not reach the occupant before the back chamber because the back chamber more rapidly inflates. In these embodiments, the rapid inflation of the back chamber ensures that the front chamber is supported while providing distinct cushioning effects for the head and the torso.

In one embodiment, airbag cushion 101 has a configuration such that back chamber 102b extends further toward the occupant than front chamber 102f than back chamber. FIG. 2B shows lower portion 113l of front region 113 extending just slightly further toward the occupant than upper portion 113u of front region 113. In another embodiment, back chamber 102b and front chamber 102f extends about the same distance toward an occupant. For these two embodiments, the back chamber extends no further toward the occupant than the front chamber. In an additional embodiment, the front chamber extends further toward the occupant when fully inflated but does not reach the occupant before the back chamber because the back chamber more rapidly inflates. In these embodiments, the rapid inflation of the back chamber ensures that the front chamber is supported while providing distinct cushioning effects for the head and the torso.

The front chamber and the back chamber generally have about the same width, which ensures that the head is cushioned more gently across the airbag cushion even when the occupant is not centrally seated. For the embodiment depicted in FIG. 1, however, the center of front portion 102f will have deeper cushioning in its center at the location of the attachment of tether 134 to partition 130.

Other embodiments are also disclosed herein of dual chamber airbag cushions such as the embodiment shown at 101. Elements that are identical or have a corresponding relationship with elements identified above with respect to cushion 101 are increased by 100 or a multiple thereof.

Figure 4:
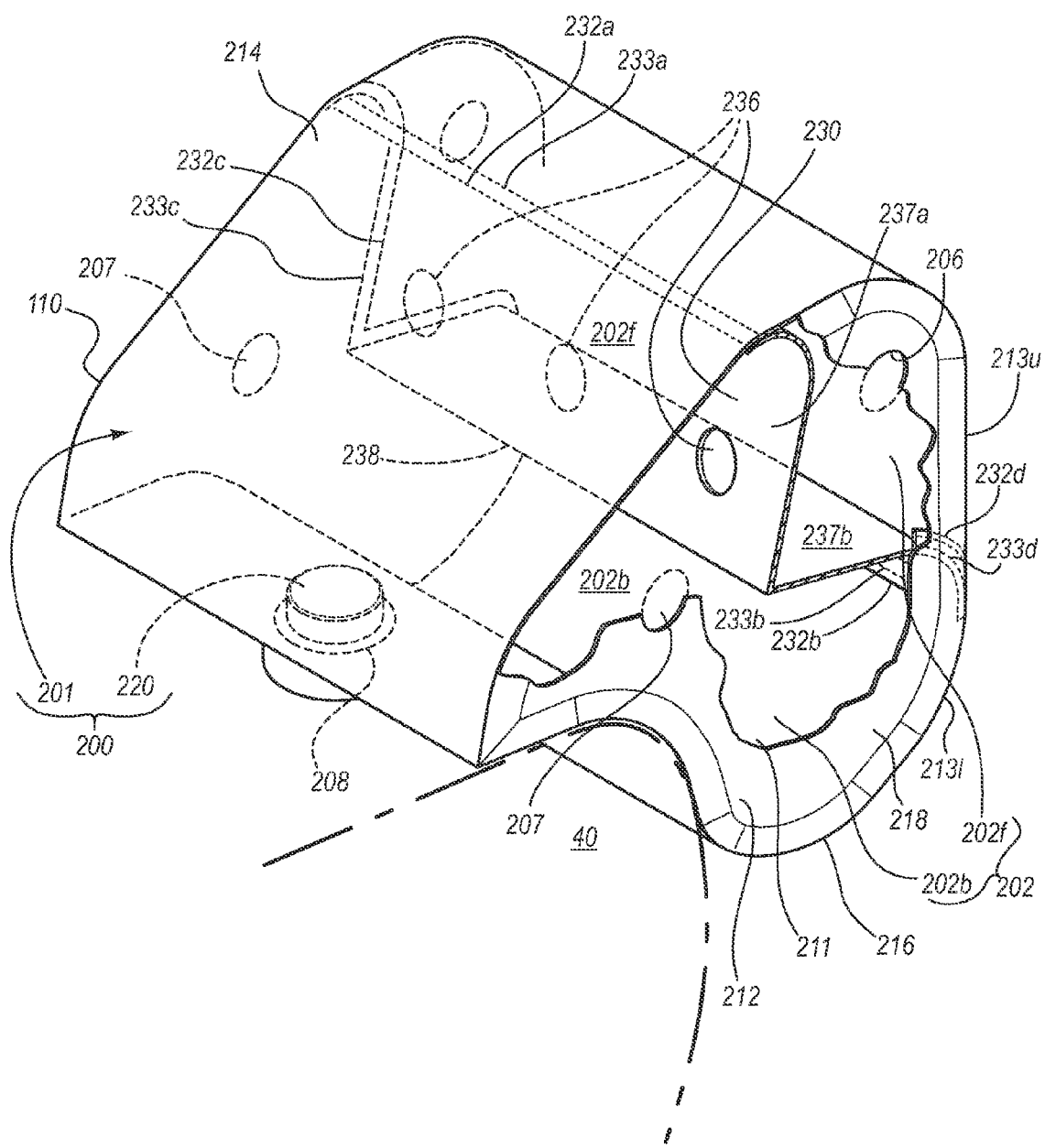
FIG. 4 is a cross-sectional view of an another embodiment of a deployed airbag cushion with a partition between a front chamber and a back chamber
Figure 5A:
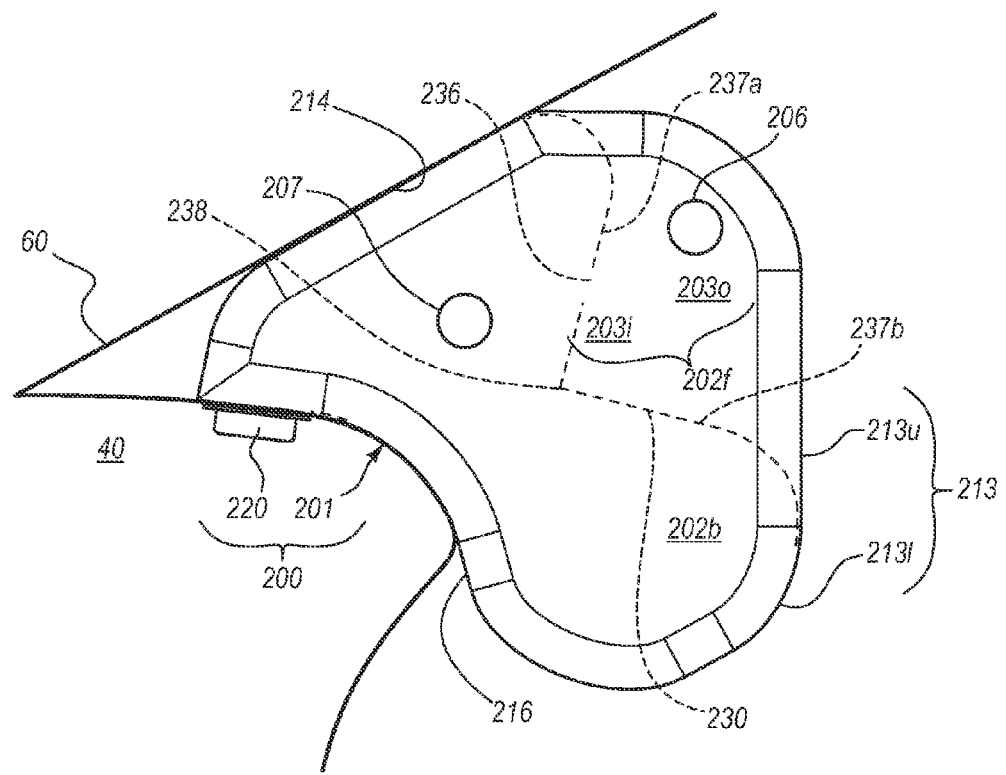
FIG. 5A is a side view of an embodiment of the airbag cushion of FIG. 4 deployed with its interior shown in phantom.
Figure 5B:
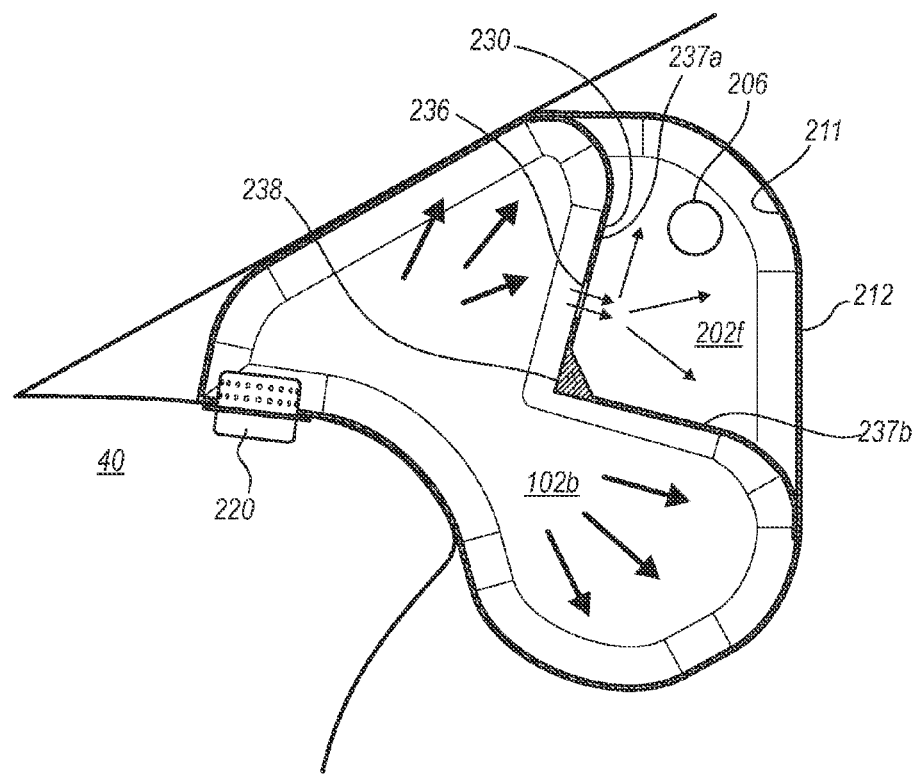
FIG. 5B is a cross-sectional view of airbag cushion shown in FIG. 4.

In the embodiment depicted in FIG. 4 and FIGS. 5A-5B, identified as airbag module 200, airbag cushion 201 has a partition 230 with ends 232a-d that are attached by seams 233a-d to cushion membrane 210. More particularly, ends 232c-d are attached to side regions 218 and ends 232a-b are respectively attached to top region 214 and to front region 213 at the transition between upper portion 213u of front region 213 and lower portion 213l of front region 213. Because ends 232a-d are attached to cushion membrane 210, a tether is not featured. However, a tether could also be used in combination with this embodiment to more securely maintain the center of partition 230 in a desired position. In other embodiments, the tether could be eliminated by sewing the partition at a center location to top region 214 and bottom region 216.

Airbag cushion 201 has a discrete vent 206 just like airbag cushion 101 has a discrete vent 106 for venting out of front chamber 102f. However, airbag cushion 201 also features a discrete vent 207 for venting inflation gas out of back chamber 102b. Discrete vents for venting inflation gas may also be located in the back chambers of the other embodiments described herein.

Partition 230 has portions 237a-b that converge at center fold 238. Portion 237a is opposite from top region 214 and portion 237b is opposite from lower portion 213l of front region 213 and bottom region 216. Note that portion 237a is more horizontal with respect to the longitudinal axis of a vehicle than portion 237b while portion 237b is more vertical with respect to the longitudinal axis of a vehicle than portion 237a. Front chamber 202f may be viewed as having two areas, an outer portion 203o and an inner portion 203i. A plane cutting through the cross-sectional view provided by FIG. 5A, bisects front chamber 202f to show that inner portion 203i has a triangular shape and outer portion 203o extends beyond back chamber 202b and has a shape that is roughly triangular with a rounded corner between a top leg that is shorter than its bottom leg. This configuration provides for deep cushioning of an occupant's head and separates the protection provided by back chamber 202b.

Figure 6:
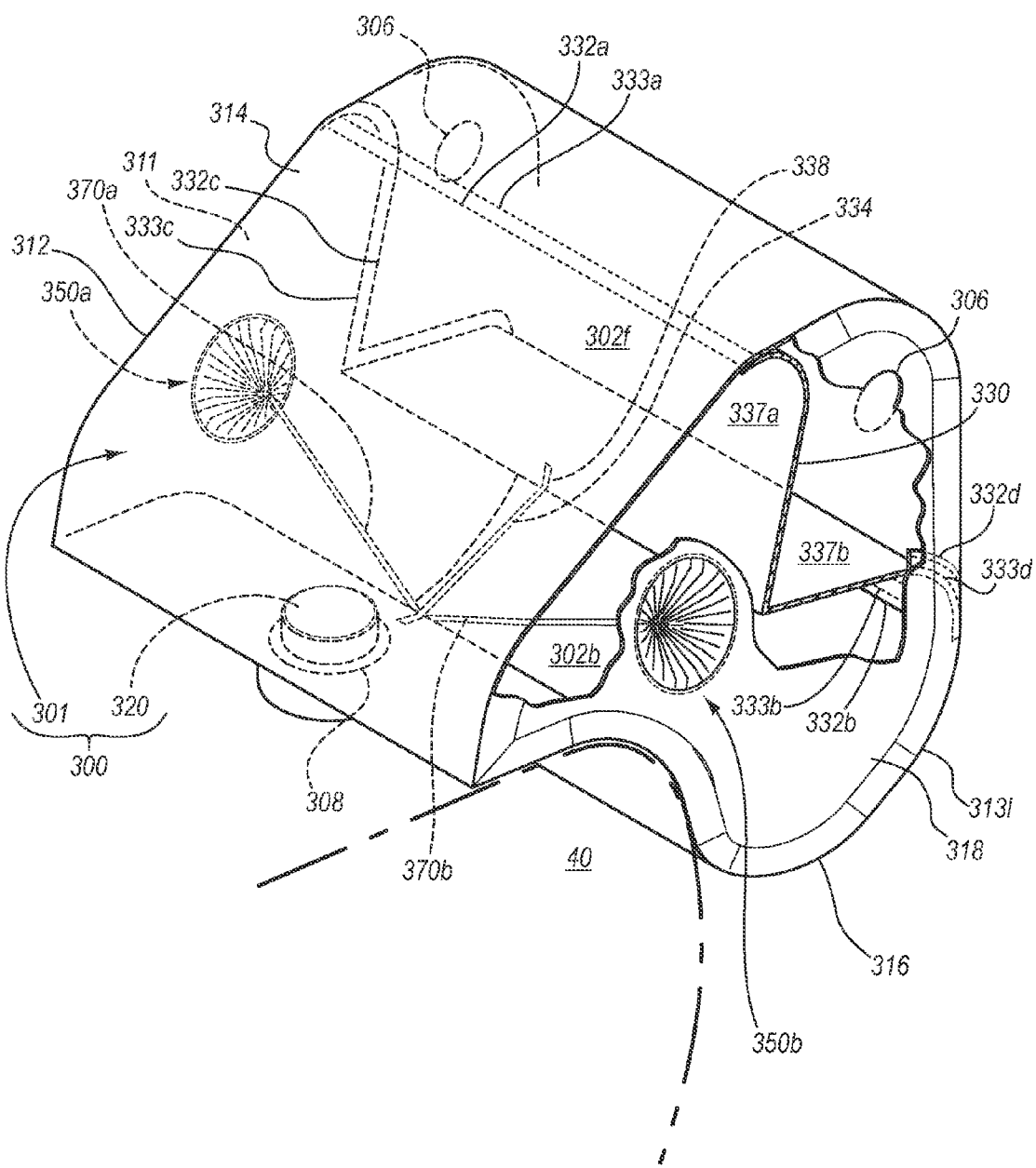
FIG. 6 is a cross-sectional view of an another embodiment of a deployed airbag cushion with a partition between a front chamber and a back chamber and also featuring closeable safety vents.

FIG. 6 is a perspective view which shows airbag cushion 301 of airbag module 300 with closeable safety vents 350a-b. Closeable safety vents 350a-b are shown in FIG. 6 after control tethers 370a-b have been pulled taut by expansion of the cushion due to the pressure of the gas in airbag cushion 301.

Note that the embodiment of the airbag module depicted in FIG. 6 and FIGS. 8A-8C has a front chamber 302f that receives inflation gas through partition 330 from back chamber 302b without internal vents as partition 330 has a permeability designed to enable gas transfer. However, partition 330 can also be replaced with a partition that has internal vents. Either embodiment enables the front chamber to inflate more gently than the back chamber to cushion the head of an occupant in a vehicle.

When airbag cushion 301 deploys, inflation gas passes from back chamber 302b through partition 330 and into front chamber 302f. Discrete vent 306 provides an outlet for the inflation gas from front chamber 203f. When airbag cushion 301 deploys without encountering obstruction in the deploying path, gas rapidly transfers through partition 330, into front chamber 302f and then out of discrete vent 306. Discrete vents may be optional in certain cushion embodiments based on venting requirements. The locations for discrete vents and closeable safety vents may vary as does the number of vents.

Figure 8A:
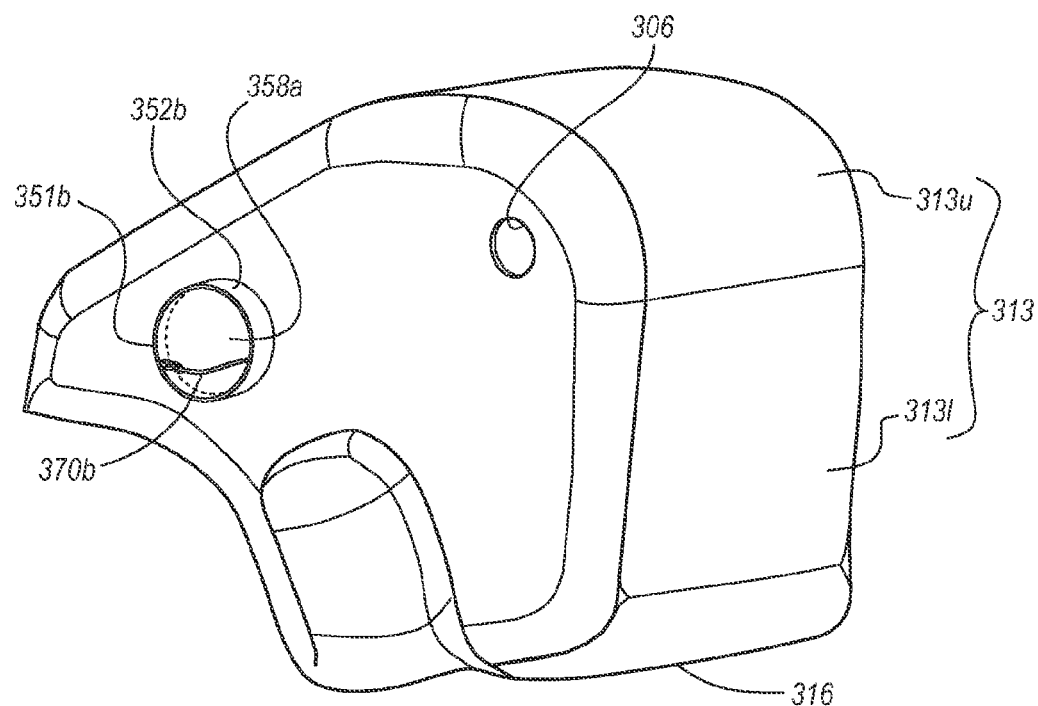
FIG. 8A is a perspective view of the airbag cushion shown in FIG. 6 that is partially inflated as it has encountered an obstruction such as an occupant who is out of position.
Figure 8B:
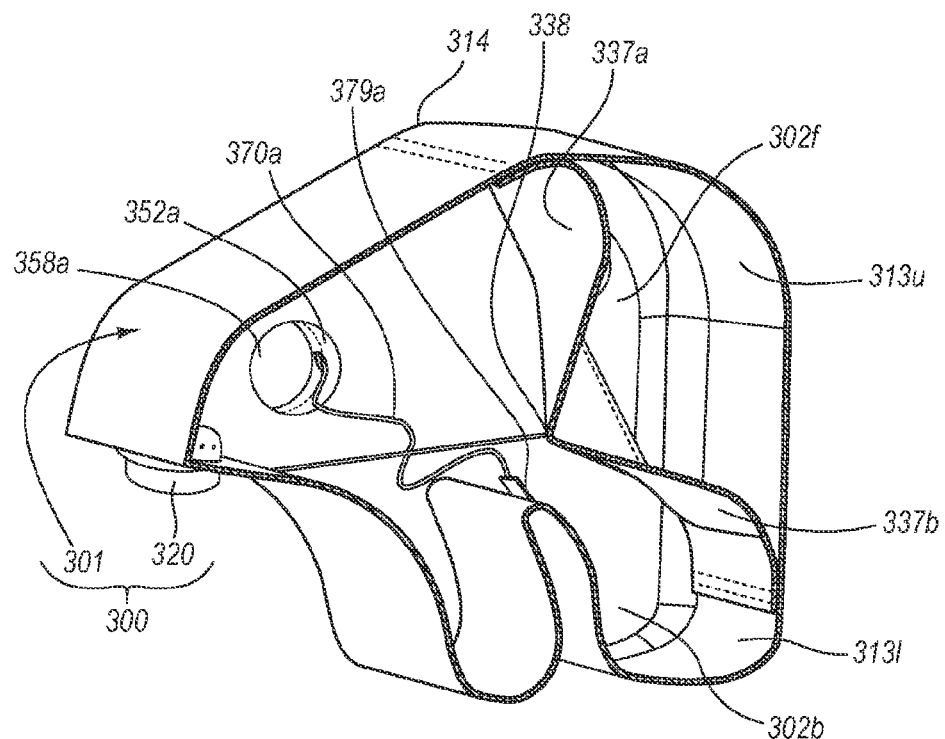
FIG. 8B is a perspective view of the airbag cushion shown in FIG. 6 when in the same position as the airbag cushion shown in FIG. 8A.
Figure 8C:
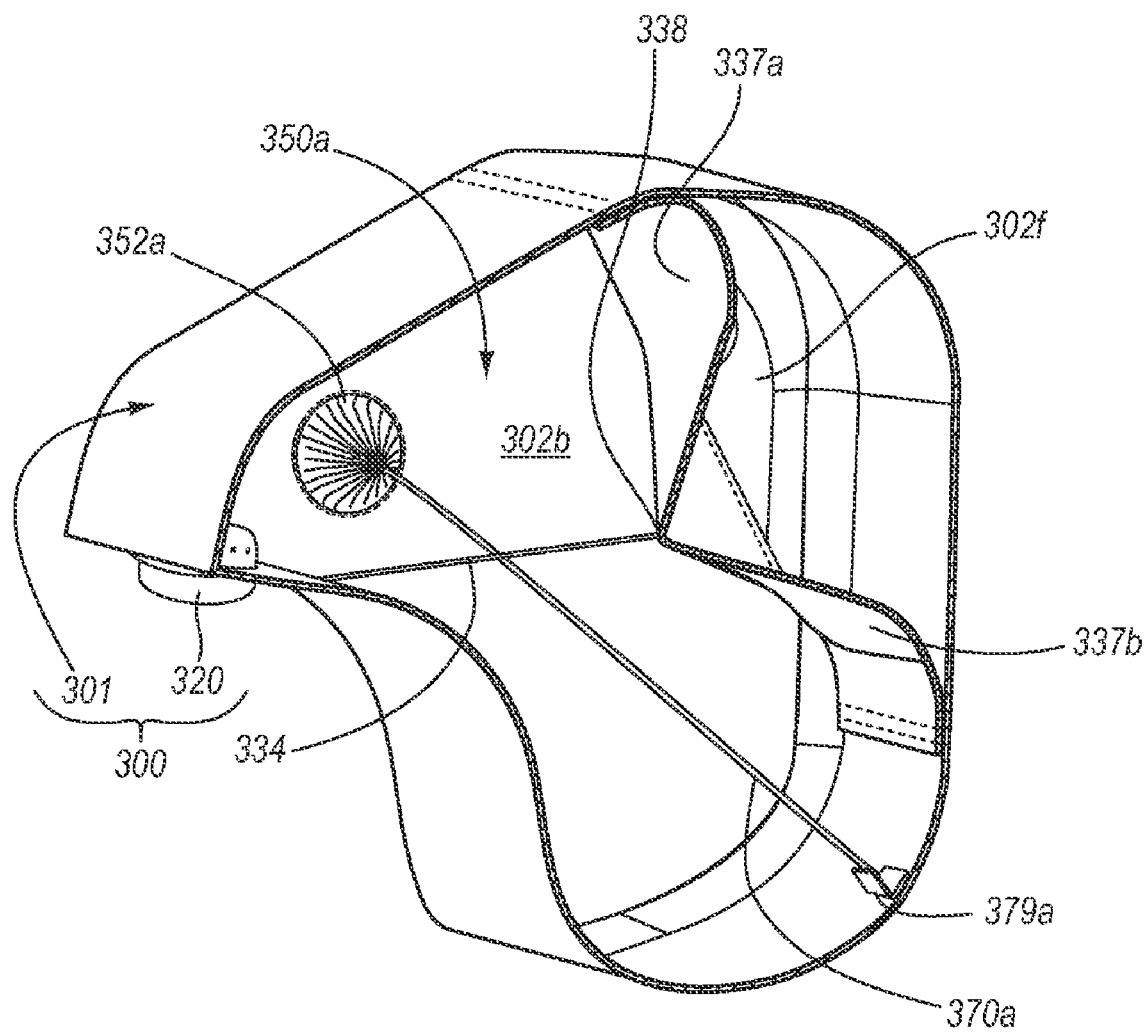
FIG. 8C is a cross-sectional view of the airbag cushion shown in FIG. 6.

When an occupant is in a normal seating position so that airbag cushion 301 can fully expand before impacting the occupant, airbag cushion appears as shown in FIG. 6 and FIG. 8C. In this manner, the occupant 30 benefits from the full restraint capability of the airbag cushion 301.

When an occupant is out of position, airbag cushion 301 appears as shown in FIGS. 8A-8B. When the initial breakout of the airbag cushion 301 occurs, closeable cinch vents 350a-b are open and, in the depicted embodiment, extend from the airbag cushion 301. Because cushion 301 is initially in a folded condition, at initial breakout (such as the initial 7 milliseconds), closeable cinch vents 350a-b are initially non-functional. Because an occupant is not positioned directly in front of the airbag cushion 301 in FIGS. 8A-8B, cushion 301 unfolds and is allowed to pressurize normally. In FIGS. 8A-8B, tethers 370a-b which respectively correspond with cinch vents 350a-b are pulled taut and gas flow through cinch vents 350a-b is restricted. In FIG. 6 and FIG. 8C, cinch vents 350a-b are completely closed, the gas vents through the fixed vents 360a-b, and normal restraint is provided to the occupant.

Other examples of embodiments of closeable vents are also disclosed in U.S. patent application Ser. No. 11/589,316 titled AIRBAG CUSHION WITH OPTIONAL VENTING FOR OUT-OF-POSITION CONDITIONS which was filed on Oct. 27, 2006 and was published as U.S. Patent Publication No. 2007/0216146. application Ser. No. 11/589,316 is hereby incorporated by reference. The particular embodiment of the closeable safety vent shown in FIG. 5 at 350a-b is also referred to as a cinch vent in application Ser. No. 11/589,316.

As shown in FIGS. 7A-7B and FIGS. 8A-8B, each safety vent 350 comprises a cinch tube 352 having a base end opposite from a terminal end. A tether holder, such as sleeve 353, with holes referred to as sleeve apertures 354, may be used to hold a vent portion 373 of tether 370. Vent aperture 358 is defined by the inner diameter of rim 351 of tube 352. Cinch vent 350 may be embodied with a generally cylindrical shape. The cinch tube may have any suitable shape such as rectangular, triangular, or polygon shapes. The cinch tube may be embodied with a height that is sufficient to achieve desired closure. In one embodiment, the cinch tube has height which is about half of its diameter. Selecting an appropriate height to diameter ratio permits the cinch tube to close during cinching without resistance from cushion membrane tension. The design permits the cinch tube to be a low-stress element in the cushion assembly which is helpful during unfolding of the cushion and pressurization. The cinch tube may comprise a nylon woven fabric-type or other suitable material known in the art.

Figure 7A:
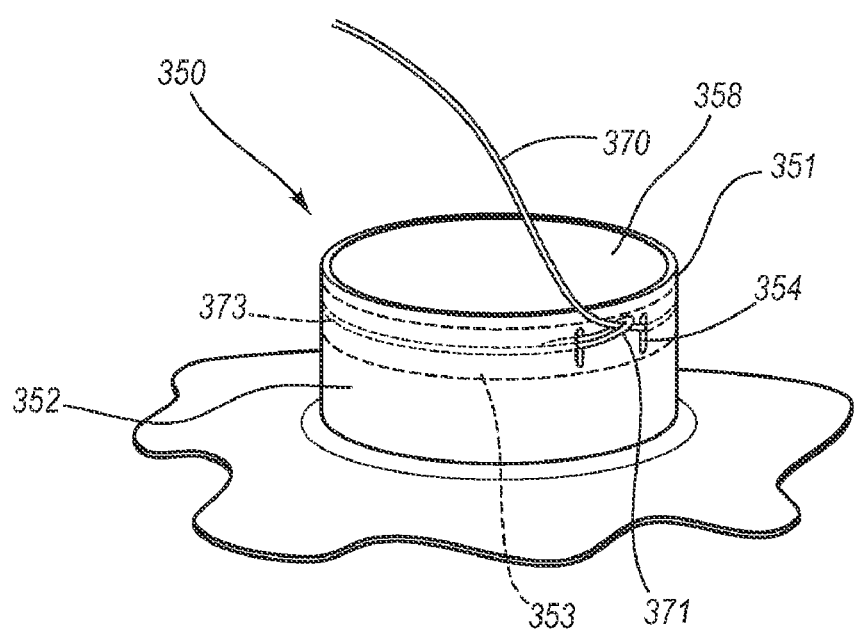
FIG. 7A is a perspective view of one of the closeable safety vents shown in FIG. 6 while it is open.
Figure 7B:
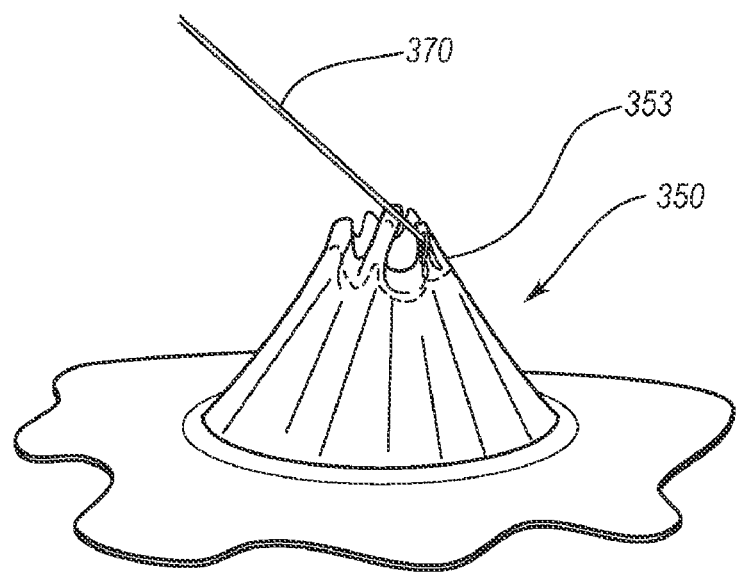

Referring to FIGS. 7A-7B, safety vent 350 is shown in more detail. Tether 370 has an end that is formed into a loop and a vent portion 373 around the majority of the perimeter of cinch tube 352. Cinch tube 352 has a sleeve 353 which holds vent portion 373 of tether 370. Vent portion 373 enters sleeve 353 via sleeve aperture 354. Other configurations can also be utilized such as stitching to hold the end of tether to cinch tube 352 or the tether could extend through the sleeve with both ends attached together to the cushion membrane at tether attachment 379. As shown in FIG. 7B, sleeve 353 is gathered together when tether 370 has been pulled taut. By causing cinch tube 352, particularly rim 351, to collapse on itself, safety vent 350 is closed without necessitating closure of the base end of the cinch tube, such that the terminal end, including rim 351, is at least partially within the interior of the inflatable airbag cushion after the aperture 358 becomes at least partially closed. In other embodiments, sleeve 353 features numerous apertures to facilitate cinching or a plurality loops or tabs may collectively act as a tether holder.

When inflatable airbag cushion 301 is fully inflated, the inflation creates a cushion membrane tension that fully extends the first end of the tether 370 coupled to the interior surface 311 of cushion membrane 310 until reaching the maximum length of tether 370, thereby pulling on the first end of the tether 370 and closing the closeable safety vent. The configuration of the cinch tube 352, such as the ratio of its height to the diameter of rim 351, in combination with tether 370, permits rim 351 of aperture 358 to be brought together without having to overcome resistance from the cushion membrane tension around closeable safety 350.

Tether 370 is configured to move with the expansion of airbag cushion 301 to enable vent portion 373 to close closeable safety vent 350. FIG. 8B shows the end of tether 370 opposite from closeable safety vent 350, which is connected to cushion membrane 310 via a tether attachment 379 and which is part of or extends from membrane 310 of airbag cushion 301. As shown in FIG. 8B, tether attachment 379 serves as an anchor for an end of tether 370. In another embodiment, the tether attachment is stitching between cushion membrane 310 and tether 370. In another embodiment, tether 370 is an integral extension of either cushion membrane 310 or cinch tube 352. Alternatively, tethers 370*a-b* are replaced by a single tether that is attached at its opposing ends to safety vents 350*a-b* and is moveably anchored to cushion membrane 310 via a tether attachment which is essentially a loop that permits movement of the single tether. The tether attachment may be disposed elsewhere such as proximate to a different portion of interior surface 311. Alternatively, the tether attachment may be a portion of exterior surface 312. For example, the tether attachment may be at the lower portion 313*l* of front region 313.

Thus, tether 370 may extend through the interior 302 of the airbag cushion 301 or may be positioned exterior to the airbag cushion 301. The location of the tether attachment 379 depends on module deployment angle, vehicle interior geometry, and cushion fold type. The tether 370 may comprise a nylon material or other suitable material known in the art.

Referring to FIG. 6 and FIGS. 8A-8C, perspective views of one embodiment of a safety vent 350 in both the open and closed positions are shown. Cinch tether 370 circumvents a majority of the perimeter of cinch tube 350 in order to properly tighten and restrict the safety vent 350. Cinch tether 370 has a length that includes an initial free length and a circumference of cinch tube 350. Cinch tether 370 may be disposed within a sleeve 353 that is formed within cinch tube 352. Access to the sleeve 353 is through a sleeve aperture 354 formed in cinch tube 352. Cinch tether 370 enters sleeve aperture 354, feeds through sleeve 354, and is coupled at an end within sleeve 353 to cinch tube 352. Coupling may be achieved by stitches, bonds, adhesives, etc. FIG. 6 and FIG. 8C show tether holder 353 gathered together so that rim 351 is collapsed on itself to close cinch tube 352.

Early in a normal inflation, gas loss through safety vent 350*a-b* is minimal. This phenomenon is due to the Bernoulli effect—pressure is lower in a moving fluid than in a stationary fluid. For example, if the convex side of a spoon is placed into a smooth stream of water from a faucet, the spoon is pulled into the stream. The higher pressure outside the moving fluid pushes the spoon into the lower pressure water. In an airbag deployment, the high velocity stream of gas flowing into the cushion creates a similar effect for approximately 30 milliseconds, particularly in the area of throat 308. Since pressure outside the cushion is still atmospheric, there is a pressure imbalance and air flows into the cushion, not out of the cushion, when the vent is positioned alongside of the gas flow stream and not in its path.

As discussed above, an advantage of this configuration is that the vent and tether are configured such that upon deployment of the inflatable airbag cushion with obstruction, the tether does not fully extend and the vent remains open, and upon deployment of the inflatable airbag cushion without obstruction, the tether extends and at least partially closes the vent. Full inflation of the inflatable airbag cushion creates a cushion membrane tension that fully extends the tether until reaching the maximum length of the tether, thereby pulling on the first end of the tether and closing the vent. An additional advantage of this configuration is that the vent is configured to close without having to overcome resistance from the cushion membrane tension around the vent.

Figure 9A:
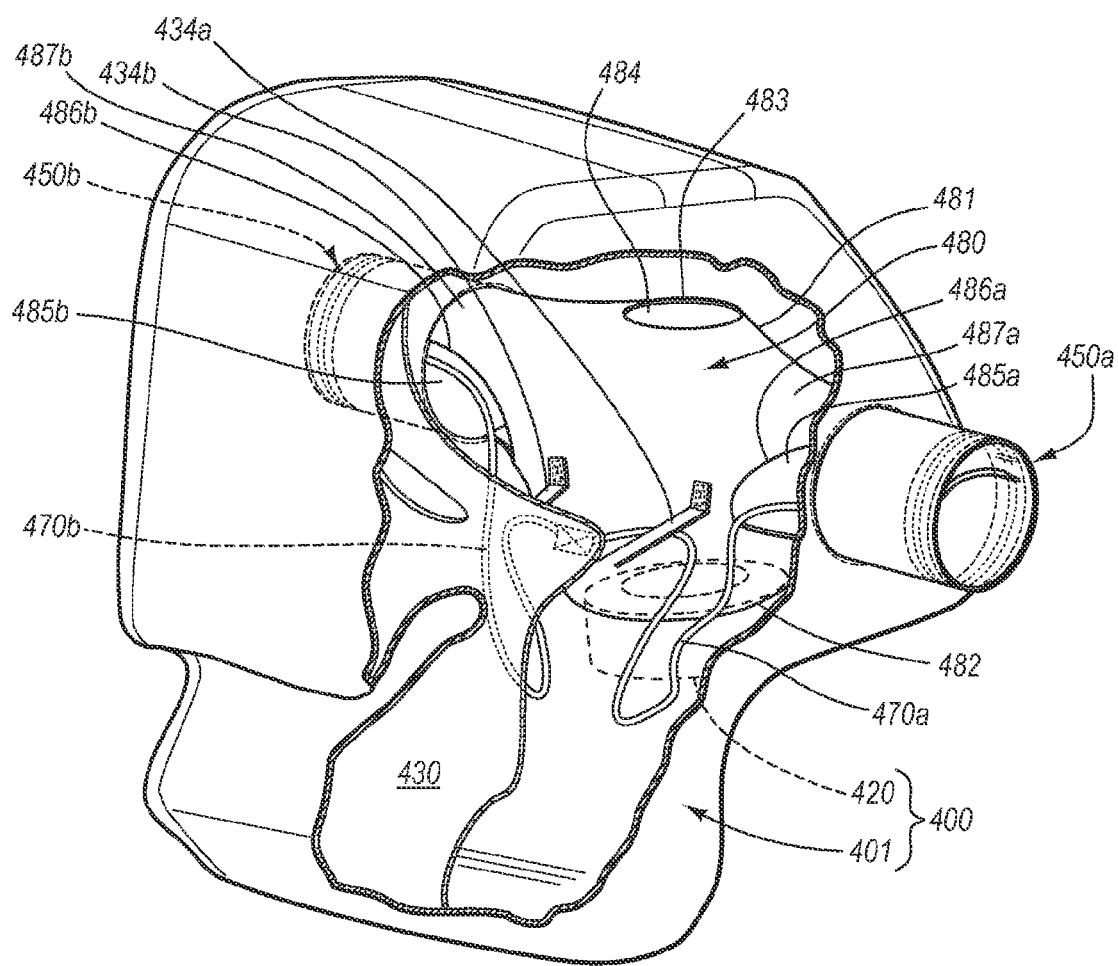
FIG. 9A is a perspective view of another embodiment of an airbag module and its airbag cushion with a partial cut-away to show a tethered partition, a tethered diffuser and closeable safety vents that are open.
Figure 9B:
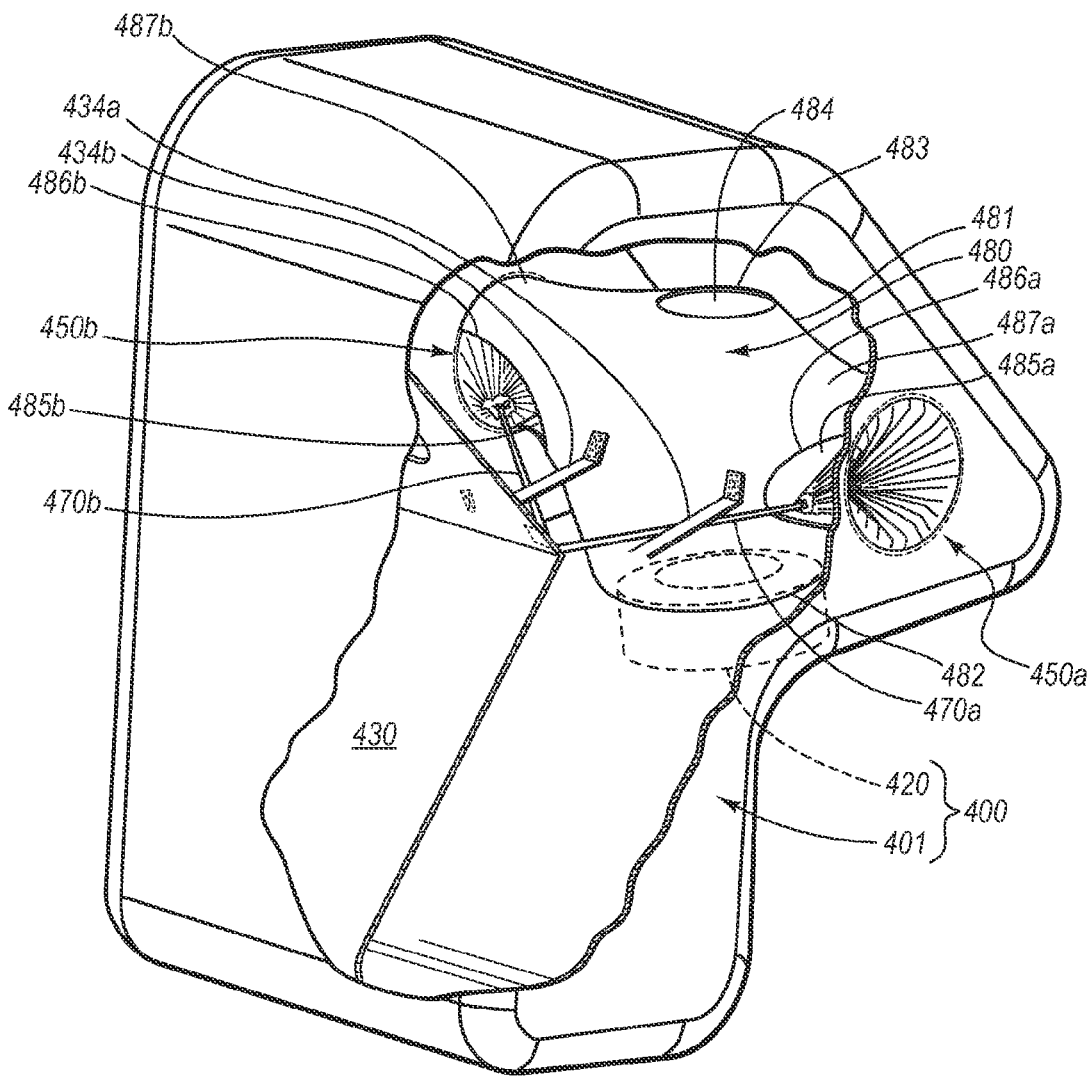
FIG. 9B is a perspective view of the airbag cushion shown in FIG. 9A with a partial cut-away to show the safety vents that are closed, as viewed from the front region.
Figure 9C:
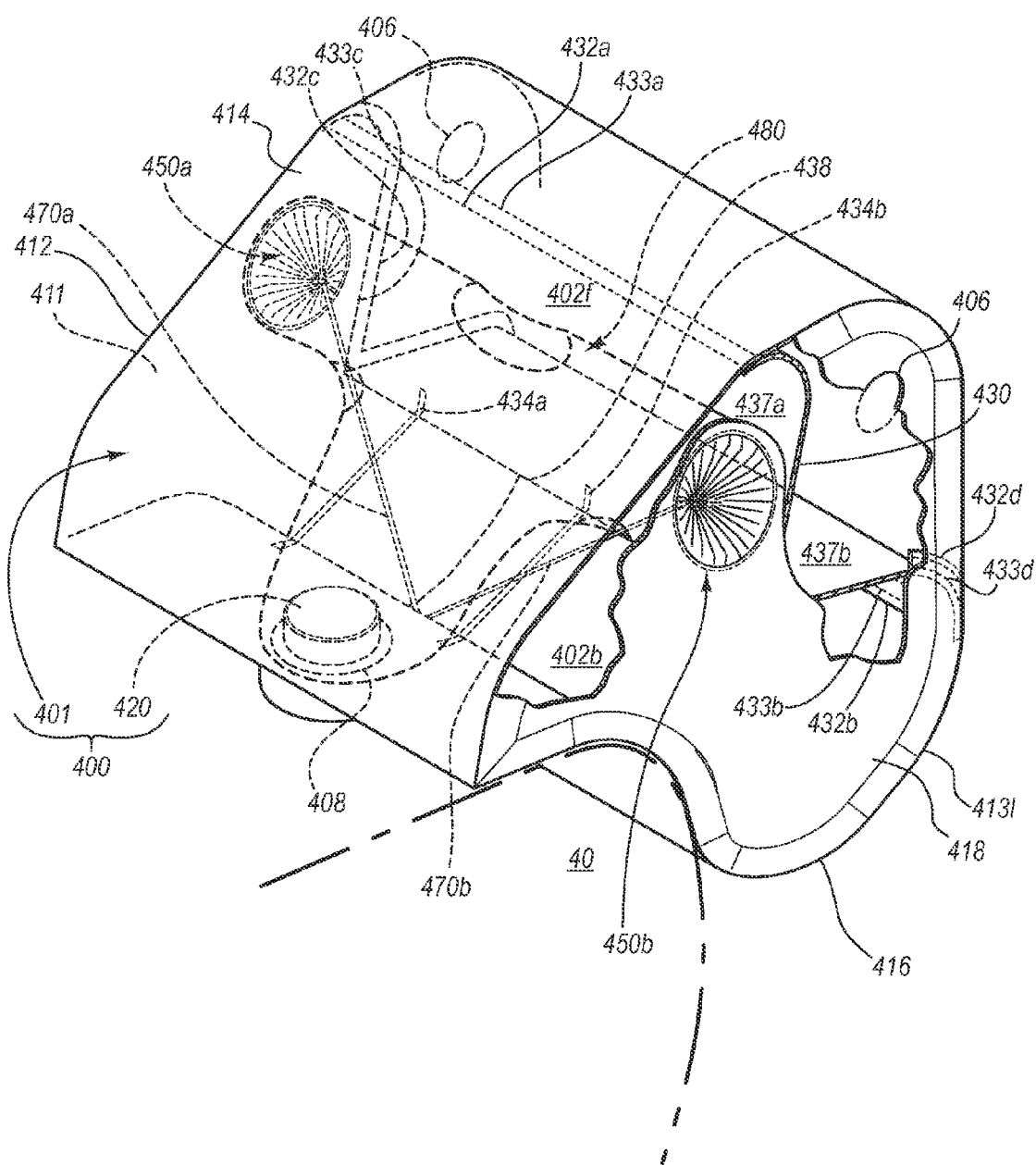
FIG. 9C is a perspective view of the airbag cushion shown in FIGS. 9A-9B with a partial cut-away to show the safety vents that are closed, as viewed through the windshield.

Another embodiment of an airbag module is depicted at 400 in FIGS. 9A-9C. Airbag cushion 401 has closeable safety vents 450*a-b* which close by tether 470*a-b* as rim 451 is drawn into the interior 402 of the inflatable airbag cushion 401 in the same manner as vents 350. Since the elements described with reference to safety vent 350 shown in FIGS. 7A-7B are identical to the elements of safety vent 450, the same features are identified with like numerals, increased by 100, in FIGS. 9A-9C, to the extent that they are shown.

Gas diffuser 480 is configured to create a pressure pocket and re-direct the inflation gas. The embodiment of the gas diffuser shown in FIGS. 9A-9C at 480 comprises a material 481 which may be integral with a surface of cushion 401 or attached to cushion 401. For example, gas diffuser 480 may be sewn together with the cushion. Gas diffuser 480 receives gas via throat 408 through opening 482 defined by a perimeter. Direct opening 484, which is defined by perimeter 483, assists with normal inflation of cushion 401 to assist in getting cushion 401 in position in time for dynamic loading purposes.

In addition to direct opening 484, gas is also directed out of side openings 485*a-485b*. Openings 485*a-b* are respectively defined by perimeters or rims 486*a-b* at the ends of each arm 487*a-b*. In the embodiment shown in FIGS. 9A-9C, a portion of each rim 486*a-b* is attached to the cushion membrane 410 so only a portion of the gas is directed out of the airbag cushion 401 via closeable safety vents 450*a-b* while another portion of the gas is directed from gas diffuser 480 into the interior 402 of airbag cushion 401. Because each arm 487*a-b* is attached to the cushion membrane, each arm 487*a-b* is configured to move respectively with closeable safety vents 450*a-b* during expansion of the inflatable airbag cushion. Movement together of each arm 487*a-b* of gas diffuser 480 and the respective closeable safety vents 450*a-b* during expansion of the airbag cushion 401 enables gas exiting the arm to be continuously directed to the respective closeable vent. In addition to permitting gas to be re-directed into the interior 402 of airbag cushion 401 when each closeable safety vent 450*a-b* is closed, each opening 485*a-b* of each arm 487*a-b* also permits each tether 470*a-b* to extend from the respective closeable vent 450*a-b* to cushion membrane 420.

Cushion 401 is depicted with each arm attached to cushion membrane at a seam, which acts as vent aligners. Of course, each arm can also be attached to the a respective closeable safety vent. In other embodiments, a seam between gas diffuser 480 and membrane 410 may not be necessary as the vent tube is an integral extension of the gas diffuser.

Not only are side openings 485*a-b* strategically located to redirect the gas flow generally toward closeable vents 450*a-b* and out of cushion 401 but side openings 485*a-b*, are also sized for optimal gas flow. Side openings 485*a-b* are large enough to allow most of the gas to flow through them. Only in out-of-position conditions does the focused gas flow from gas diffuser 480 to the aligned closeable vents 450*a-b* to allow a more rapid escape of the inflation gas as shown in FIG. 1A.

As previously indicated, gas diffuser 480 and closeable vents 450*a-b* are not independent of each other such that the flow remains aligned or focused with closeable vents 450*a-b*. So if the occupant is in a normal position and inflation is unrestricted, gas diffuser 480 functions as normal to re-direct the inflation gas generally toward the vent(s). The large vent(s) are quickly closed as the cushion fully expands retaining gas for normal occupant restraint.

While gas diffuser 480 is T-shaped because arms 487*a-b* are directly opposite each other, other configurations may also be utilized. For example, the gas diffuser may be rectangular, trapezoidal, hexagonal, round, etc. It may also have a portion which is round or elliptical while other portions are angled. Additional information about airbag cushions with a diffuser or gas deflector having arms aligned with closeable safety vents is provided in U.S. patent application Ser. No. 11/758,419, which was published as U.S. Patent Publication No. 20080303256. U.S. patent application Ser. No. 11/758,419 is hereby incorporated by reference.

Figure 10:
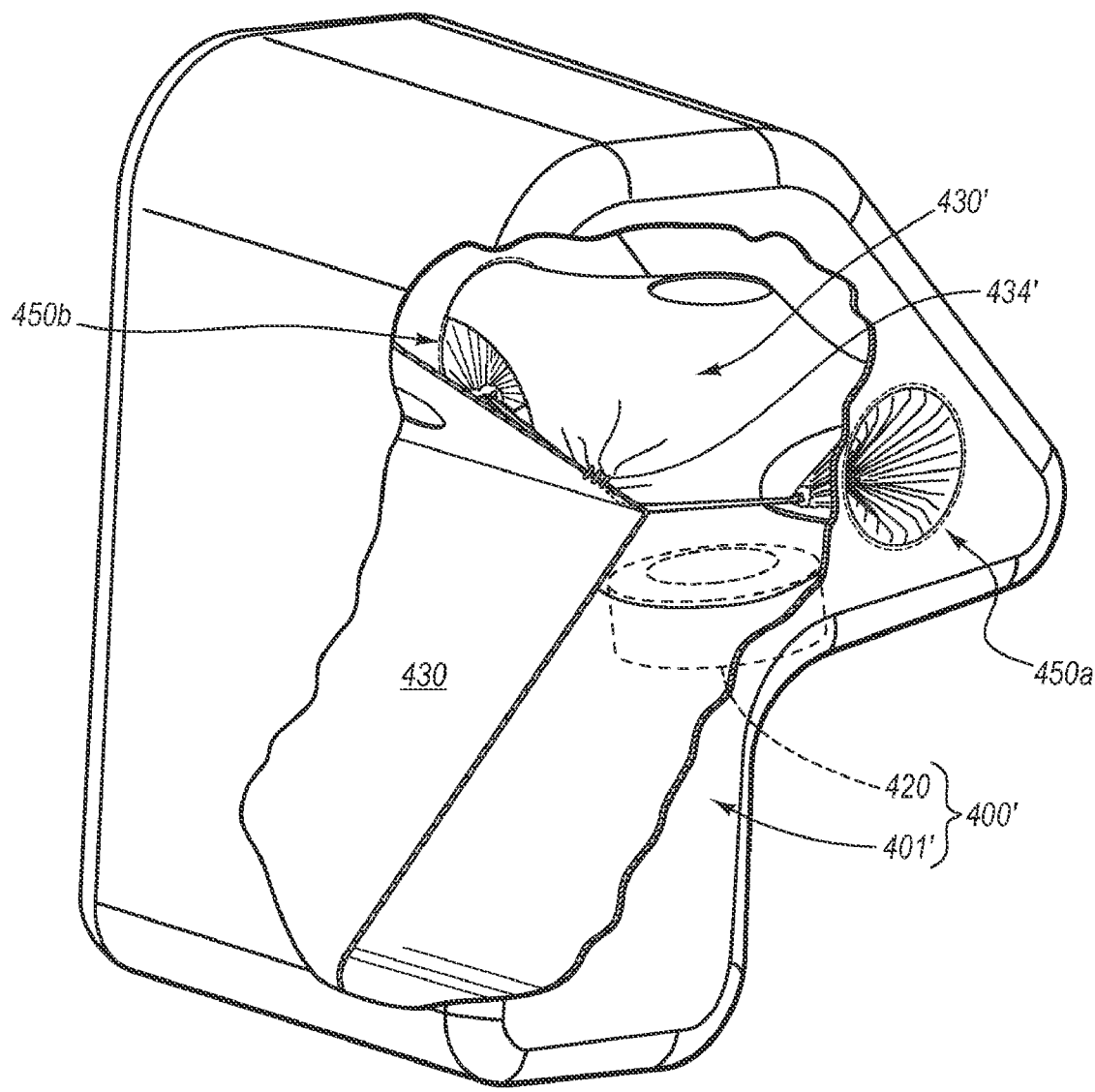
FIG. 10 is a perspective view of of another embodiment of an airbag cushion which differs from the embodiment shown in FIGS. 9A-9C in that the diffuser is sewn to the partition instead of being tethered.

FIG. 10 depicts airbag cushion 401' which differs from airbag cushion 400 in that diffuser 480' is sewn to partition 430' with threads 434' instead of being tethered together. The other components of airbag cushion 401' are the same as those of airbag cushion 401.

Figure 11:
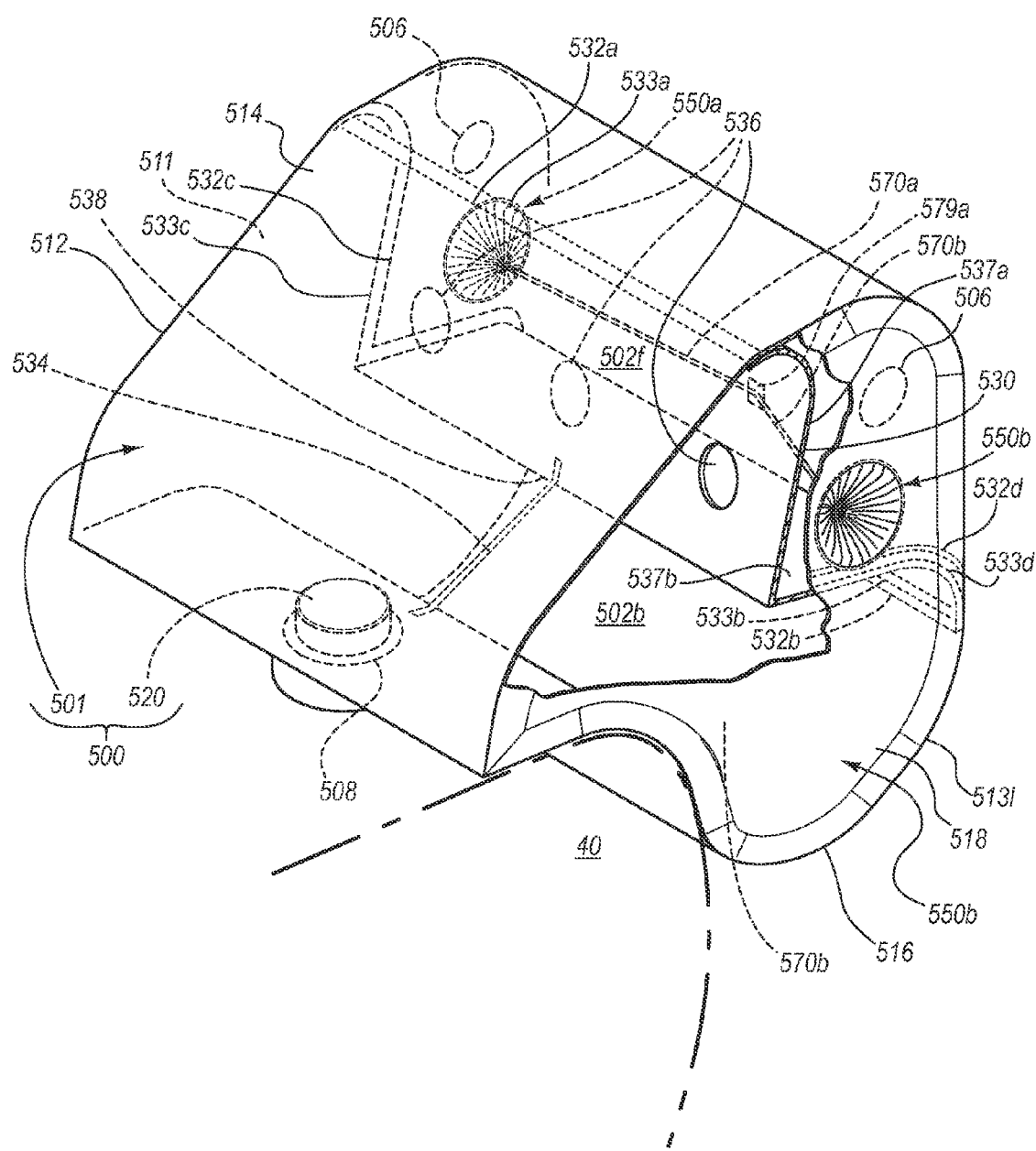
FIG. 11 is a cross-sectional view of an another embodiment of a deployed airbag cushion with a partition between a front chamber and a back chamber and also featuring closeable safety vents in the front chamber.
Figure 12A:
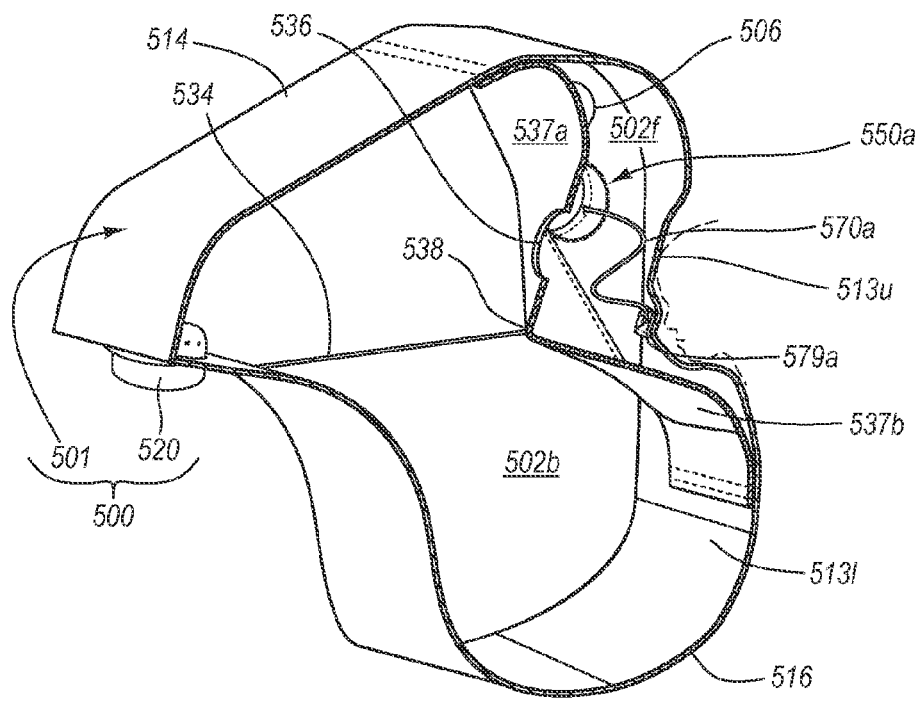
FIG. 12A is a cross-sectional view of the airbag cushion shown in FIG. 9 when an occupant's head has caused the front chamber to only partially inflate.
Figure 12B:
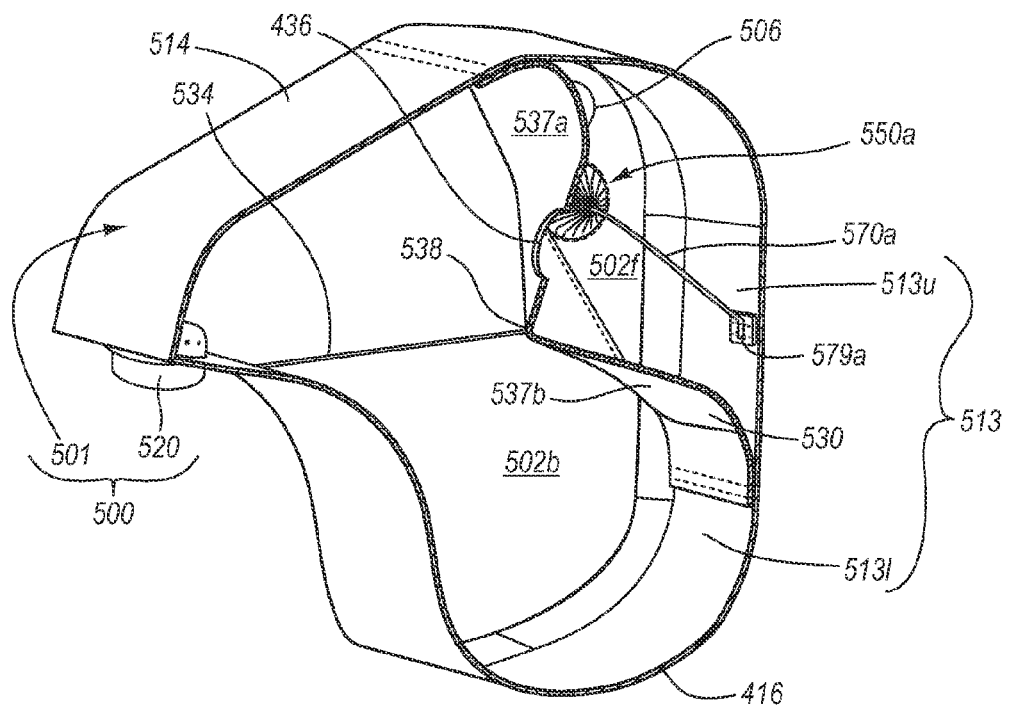
FIG. 12B is a cross-sectional view of the airbag cushion shown in FIG. 9 with a front chamber that is inflated as it has not encountered an obstruction.

FIG. 11 and FIGS. 12A-12B depict another airbag module at 500 with a dual chamber airbag cushion 501. Like the other embodiments disclosed herein, this embodiment also decouples the restraining force for the occupant's head and the occupant's chest so that the head is not over restrained while also restraining the chest. Airbag cushion 501 also features closeable safety vents 550 and corresponding tethers 570 in front chamber 502*f* instead of in back chamber 502*b*. One advantage of closeable safety vents 550 and tethers 570 is that the restraint provided by front chamber 502*f* can be even more finely controlled than with respect to the other embodiments.

Safety vent 550 operates in the same manner as safety vent 350 shown in FIGS. 7A-7B and has the same elements. Since the elements described with reference to safety vent 350 shown in FIGS. 7A-7B are identical to the elements of safety vent 550, the same features are identified with like numerals, increased by 200, in FIG. 11 and FIGS. 12A-12B, to the extent that they are shown. For the elements that are not shown in FIG. 11 and FIGS. 12A-12B regarding safety vent 550 reference should be made to FIGS. 7A-7B. The various embodiments of safety vents that can be used in the back chamber 502*b* can also be used in front chamber 502*f*. When the head of an occupant is encountered by front chamber 502*f* and obstructs the deploying airbag cushion 501, full inflation of airbag cushion 501 is prevented as shown in FIG. 12A. When airbag cushion 501 impacts an occupant, tether 570*a* (as shown in FIG. 12A) and tether 570*b* (not shown in FIG. 12A) remain slack. Closeable safety vents 550*a-b* remain open and venting rapidly occurs from safety vents 550*a-b* and discrete vents 506. Discrete vents 506*a-b* may be located in the side regions 518 of cushion 501 near closeable vents 550*a-b*, as shown. The cushion inflation is restricted and the occupant receives less than the full deployment loading of the front chamber 502*f* of cushion 501. The partial inflation and resulting limited restraint provides an occupant with less force to the head and neck while maintaining stronger force to the chest.

During initial deployment, airbag cushion 501 unfolds and safety vents 550*a-b* provide little or no venting. As discussed above, airbag cushion 501 expands in a manner such that the safety vents 550*a-b* will remain completely or nearly open and full venting occurs unless front chamber 502*f* obstructed. If further unobstructed, safety vents 550*a-b* completely close and an occupant benefits from the full restraint capability of airbag cushion 501, as shown in FIG. 11 and FIG. 12B.

The partial inflation of front chamber 502*f* shown in FIG. 12A and the full inflation of airbag cushion 501 shown in FIG. 12B the depict the stages of inflation that typically occur. An occupant such as an average male, will have some delay in impacting front chamber 502*f* compared with an average female. The delayed impact of the average male, which typically would have a larger mass and is also typically seated further from the airbag, allows front chamber 502*f* enough time to fully inflate to provide adequate cushioning as shown in FIG. 12B. In contrast, the head of an occupant with a smaller mass, typically seated closer to the airbag rapidly impacts front region 513, particularly upper portion 513*u*, which causes tether 570*a-b* to remain open so that front chamber 502*f* does not fully inflate. The partial inflation of front chamber 502*f* ensures that the head of the occupant receives cushioning with less force than the occupant's chest does via back chamber 502*b*, thereby decoupling the cushioning force that is applied to the head and the chest.

Embodiments disclosed herein illustrate novel techniques for venting an airbag cushion to retain an open vent when an occupant obstructs the path of a deploying cushion and to close and remain closed when an occupant does not obstruct a deploying cushion. Airbag cushions provide improved safety by deploying with less pressure when an occupant is obstructing deployment. The airbag cushions deploy with more pressure when an occupant is not obstructing deployment and when high pressure is required to provide the necessary restraint. The frontal airbag cushions described herein have application to both driver and passenger positions. Furthermore, the airbag cushions may be configured in a variety of sizes based on design constraints. The vent may be closed by bringing the rim of the vent together, at least partially closing the vent and without pulling the rim into the perimeter of the vent.

Various embodiments for closeable vents have been disclosed herein. The closeable vents disclosed herein are examples of means for venting gas out of the airbag. A control cord or control tether, as disclosed herein, is an example of means for restricting gas venting by moving the covering means upon inflatable airbag deployment without obstruction and enabling the vent aperture to remain uncovered upon inflatable airbag deployment with obstruction. The control tether is also an example of means for restricting gas venting by closing the venting means upon inflatable airbag deployment without obstruction and enabling the venting means to remain open upon inflatable airbag deployment with obstruction.

The combination of a closeable vent and a control tether, as disclosed herein, is an example of means for restricting gas venting by closing the venting means to reduce the aperture of the venting means upon inflatable airbag deployment without obstruction and enabling the venting means to remain open upon inflatable airbag deployment with obstruction. The combination of a sleeve of a cinch tube and a cinch tether with a plurality of stoppers, as disclosed herein, is an example of means for restricting gas venting by incrementally cinching the venting means to reduce the circumference of the venting means upon inflatable airbag deployment without obstruction and enabling the venting means to remain open upon inflatable airbag deployment with obstruction.

It will be apparent to those having skill in the art that changes may be made to the details of the above-described embodiments without departing from the underlying principles of the invention. Embodiments of the invention in which an exclusive property or privilege is claimed are defined as follows. Note that elements recited in means-plus-function format are intended to be construed in accordance with 35 U.S.C. §112 ¶6.

The invention claimed is:

1. An airbag module comprising:
an inflatable frontal airbag cushion comprising a cushion membrane that defines an interior of the inflatable airbag cushion,
wherein the cushion membrane has a front region configured to be directed toward an occupant in a vehicle when the cushion is deployed,
wherein the front region has an upper portion and a lower portion,
wherein the cushion membrane has a top region above the upper portion of the front region, and
wherein the cushion membrane has a bottom region below the lower portion of the front region; and
a partition that divides the interior of the inflatable airbag cushion into a back chamber and a front chamber;
wherein the front chamber is at least partially defined by the upper portion of the front region and is positioned such that, when inflated, the back chamber is between the front chamber and a windshield of a vehicle to minimize contact between the front chamber and the windshield;
wherein the back chamber is at least partially defined by the top region, the lower portion of the front region, and the bottom region;
wherein the back chamber is sized to be inflated to a substantially larger volume than the front chamber such that, when the airbag cushion is inflated, the back chamber extends from the occupant's torso to a windshield of a vehicle;
wherein the front chamber and the back chamber are positioned relative to each other such that when the airbag cushion is inflated and an occupant in a normal seated position, the front chamber is directed toward the occupant's head and the back chamber is directed toward the occupant's torso; and
wherein the back chamber is positioned to receive inflation gas directly from an inflator while the front chamber receives inflation gas from the back chamber, whereby the front chamber inflates less rapidly than the back chamber for cushioning the head of an occupant in a vehicle with less force than the chest of an occupant is cushioned by the back chamber.

2. The airbag module of claim 1, wherein a tether extends from the partition to an interior surface of the airbag cushion.

3. The airbag module of claim 2, wherein the tether extends from the interior surface of the airbag cushion near an inflator.

4. The airbag module of claim 1, wherein the partition is integral with the top region of cushion membrane and at least part of the front region.

5. The airbag module of claim 1, wherein the partition is attached within the airbag cushion to an interior surface of the airbag cushion.

6. The airbag module of claim 1, wherein the partition has vents to permit inflation gas to move from the back chamber to the front chamber.

7. The airbag module of claim 1, wherein the partition has sufficient permeability to permit inflation gas to move from the back chamber to the front chamber.

8. The airbag module of claim 1, further comprising:
at least one closeable safety vent; and
a tether anchored to the cushion membrane, wherein the tether is configured such that upon deployment of the inflatable airbag cushion with obstruction, the tether does not fully extend and the closeable safety vent remains open, and upon deployment of the inflatable airbag cushion without obstruction, the tether extends and at least partially closes the closeable safety vent.

9. The airbag module of claim 8, further comprising a gas deflector positioned in the interior of the inflatable airbag cushion to direct inflation gas from an inflator, wherein the gas deflector has an arm configured to permit gas to be re-directed from an inflator to the closeable safety vent, and wherein the arm of the gas deflector and the closeable vent are configured to move together during expansion of the inflatable airbag cushion.

10. The airbag module of claim 9, wherein movement together of the arm of the gas deflector and the closeable vent during expansion of the airbag enables gas exiting the arm to be continuously directed to the at least one closeable safety vent.

11. The airbag module of claim 9, wherein the arm terminates at an opening defined by a rim and at least a portion of the rim is attached to the cushion membrane while the remainder of the rim is unattached to the cushion membrane so that gas can be re-directed out of the gas deflector and into the interior of the inflatable airbag cushion when the closeable safety vent is closed.

12. The airbag module of claim 1, further comprising:
at least one closeable safety vent comprising a cinch tube having a base end opposite from a terminal end, wherein the terminal end has an aperture defined by rim; and
a tether coupled to the terminal end of the cinch tube and extending around a majority of the aperture of the terminal end of the cinch tube, the tether being further coupled to a surface of the airbag cushion such that upon inflatable airbag deployment with obstruction, the cinch cord does not fully extend and the cinch tube remains open, and upon inflatable airbag deployment without obstruction, the cinch cord extends and at least partially closes the aperture at the terminal end, without necessitating closure of the base end of the cinch tube, such that the terminal end is at least partially within the interior of the inflatable airbag cushion after the aperture becomes at least partially closed.

13. The airbag module of claim 1, further comprising:
at least one closeable safety vent; and
a tether connected to the closeable safety vent at a first end and anchored to the cushion membrane at a second end, the first end and the second end separated by a length, wherein the tether is configured such that upon deployment of the inflatable airbag cushion with obstruction, the tether does not fully extend and the vent remains open, and upon deployment of the inflatable airbag cushion without obstruction, the tether extends and at least partially closes the closeable safety vent, wherein full inflation of the inflatable airbag cushion creates a cushion membrane tension that fully extends the second end of the tether until reaching the maximum length of the tether thereby pulling on the first end of the tether and closing the closeable safety vent, and wherein the closeable safety vent is configured to close without having to overcome resistance from the cushion membrane tension around the closeable safety vent.

14. The airbag module of claim 1, further comprising:
at least one closeable safety vent; and
at least one closeable vent having an aperture defined by a rim; and
a tether connected to the rim of the closeable safety vent at a first end and anchored to the cushion membrane at a second end, wherein the tether is configured such that upon deployment of the inflatable airbag cushion with obstruction, the tether does not fully extend and the closeable safety vent remains open, and upon deployment of the inflatable airbag cushion without obstruction, the tether extends and at least partially closes the closeable safety vent by bringing the rim of the aperture together, wherein full inflation of the inflatable airbag cushion creates a cushion membrane tension that fully extends the second end of the tether until reaching the maximum length of the tether thereby pulling on the first end of the tether and closing the closeable safety vent by bringing the rim of the aperture together, and wherein the rim of the aperture is configured to be brought together without having to overcome resistance from the cushion membrane tension around the closeable safety vent.

15. The airbag module of claim 1, further comprising a fixed vent disposed on the airbag and configured to vent gas during airbag deployment with and without obstruction.

16. An airbag module comprising:
an inflatable frontal airbag cushion comprising a cushion membrane that defines an interior of the inflatable airbag cushion,
wherein the cushion membrane has a front region configured to be directed toward an occupant in a vehicle when the cushion is deployed,
wherein the front region has an upper portion and a lower portion,
wherein the cushion membrane has a top region above the upper portion of the front region, and
wherein the cushion membrane has a bottom region below the lower portion of the front region;
a partition that divides the interior of the inflatable airbag cushion into a back chamber and a front chamber;
a tether extending from the partition to an interior surface of the airbag cushion to maintain the partition in a configuration such that at least a portion of the partition is pulled away from the upper portion of the front region;
wherein the front chamber is at least partially defined by the upper portion of the front region and is positioned such that, when inflated, the back chamber is between the front chamber and a windshield of a vehicle to minimize contact between the front chamber and the windshield;
wherein the back chamber is sized to be inflated to a substantially larger volume than the front chamber such that, when the airbag cushion is inflated, the back chamber extends from the occupant's torso to a windshield of a vehicle;
wherein the partition is positioned such that when the airbag cushion is inflated and an occupant in a normal seated position, the front chamber is directed toward an occupant's head and the back chamber is directed toward the occupant's torso; and
wherein the back chamber is positioned to receive inflation gas directly from an inflator while the front chamber receives inflation gas through the partition from the back chamber, whereby the front chamber inflates less rapidly than the back chamber for cushioning the head of an occupant in a vehicle with less force than the torso of an occupant is cushioned by the back chamber.

17. The airbag module of claim 16, wherein the tether extends from the interior surface of the airbag cushion near an inflator.

18. The airbag module of claim 16, wherein the partition is integral with the top region of cushion membrane and at least part of the front region.

19. The airbag module of claim 16, wherein the partition has vents to permit inflation gas to move from the back chamber to the front chamber.

20. The airbag module of claim 16, wherein the partition has sufficient permeability to permit inflation gas to move from the back chamber to the front chamber.

21. An airbag module comprising:
an inflatable frontal airbag cushion comprising a cushion membrane that defines an interior of the inflatable airbag cushion,
wherein the cushion membrane has a front region configured to be directed toward an occupant in a vehicle when the cushion is deployed,
wherein the front region has an upper portion and a lower portion,
wherein the cushion membrane has a top region above the upper portion of the front region,
wherein the cushion membrane has a bottom region below the lower portion of the front region, and
wherein the cushion membrane has opposing side regions;
a partition that divides the interior of the inflatable airbag cushion into a back chamber and a front chamber;
wherein the partition is sewn to the top region, the front region and the side regions in a configuration such that at least a portion of the partition extends away from the upper portion of the front region;
wherein the front chamber is at least partially defined by the upper portion of the front region and is positioned such that, when inflated, the back chamber is between the front chamber and a windshield of a vehicle to minimize contact between the front chamber and the windshield;
wherein the back chamber is sized to be inflated to a substantially larger volume than the front chamber such that, when the airbag cushion is inflated, the back chamber extends from the occupant's torso to a windshield of a vehicle;
wherein the partition is positioned such that when the airbag cushion is inflated and an occupant in a normal seated position, the front chamber is directed toward an occupant's head and the back chamber is directed toward the occupant's torso; and
wherein the back chamber is positioned to receive inflation gas directly from an inflator while the front chamber receives inflation gas through the partition from the back chamber, whereby the front chamber inflates less rapidly than the back chamber for cushioning the head of an occupant in a vehicle with less force than the chest of an occupant is cushioned by the back chamber.

22. The airbag module of claim 21, wherein the front region is integral with the top region and with the bottom region.

23. The airbag module of claim 21, wherein the partition has vents to permit inflation gas to move from the back chamber to the front chamber.

24. The airbag module of claim 21, wherein the partition has sufficient permeability to permit inflation gas to move from the back chamber to the front chamber.

* * * * *